United States Patent
da Silva et al.

(10) Patent No.: US 11,627,504 B2
(45) Date of Patent: Apr. 11, 2023

(54) RADIO NETWORK NODES, WIRELESS DEVICE AND METHODS PERFORMED THEREIN FOR HANDLING COMMUNICATION IN A WIRELESS COMMUNICATION NETWORK

(71) Applicant: Telefonaktiebolaget LM Ericsson (publ), Stockholm (SE)

(72) Inventors: Icaro L. J. da Silva, Solna (SE); Patrik Rugeland, Stockholm (SE); Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 789 days.

(21) Appl. No.: 15/761,726

(22) PCT Filed: Feb. 19, 2018

(86) PCT No.: PCT/SE2018/050160
§ 371 (c)(1),
(2) Date: Mar. 20, 2018

(87) PCT Pub. No.: WO2018/174772
PCT Pub. Date: Sep. 27, 2018

(65) Prior Publication Data
US 2018/0343595 A1  Nov. 29, 2018

Related U.S. Application Data

(60) Provisional application No. 62/476,052, filed on Mar. 24, 2017.

(51) Int. Cl.
*H04W 36/00* (2009.01)
*H04W 74/08* (2009.01)
(Continued)

(52) U.S. Cl.
CPC ...... *H04W 36/0077* (2013.01); *H04B 7/0695* (2013.01); *H04J 11/0073* (2013.01);
(Continued)

(58) Field of Classification Search
CPC ............. H04W 72/1226; H04W 74/00; H04W 74/008; H04W 74/08; H04W 74/0833
See application file for complete search history.

(56) References Cited

U.S. PATENT DOCUMENTS

| 2011/0103317 A1 | 5/2011 | Ribeiro et al. |
| 2012/0177006 A1 | 7/2012 | Tsai et al. |

(Continued)

FOREIGN PATENT DOCUMENTS

| CN | 106464351 A | 2/2017 |
| CN | 106465403 A | 2/2017 |

(Continued)

OTHER PUBLICATIONS

Guo et al. U.S. Appl. No. 62/432,393, filed Dec. 9, 2016, p. 15 (Year: 2016).*

(Continued)

*Primary Examiner* — Ashley Shivers
(74) *Attorney, Agent, or Firm* — Murphy, Bilak & Homiller, PLLC

(57) ABSTRACT

A first exemplary embodiment provides a method performed by a wireless device (10) for handling communication of the wireless device in a wireless communication network, wherein the wireless communication network comprises a first radio network node (12) and a second radio network node (13), which first radio network node (12) serves the wireless device (10). The wireless device receives an indication indicating a mapping between one or more channel state information reference signals, CSI-RS, and one or more random access channel, RACH, configurations. The (Continued)

wireless device receives one or more CSI-RSs from the second radio network node (13), and selects a CSI-RS out of the one or more received CSI-RSs. The wireless device further initiates a random access procedure towards the second radio network node (13) using at least part of the RACH configuration mapped to the selected CSI-RS.

12 Claims, 20 Drawing Sheets

(51) Int. Cl.
*H04L 5/00* (2006.01)
*H04B 7/06* (2006.01)
*H04J 11/00* (2006.01)
*H04W 72/044* (2023.01)
*H04W 36/06* (2009.01)

(52) U.S. Cl.
CPC .......... *H04J 11/0076* (2013.01); *H04L 5/005* (2013.01); *H04L 5/0053* (2013.01); *H04L 5/0092* (2013.01); *H04W 36/0072* (2013.01); *H04W 74/0833* (2013.01); *H04L 5/0048* (2013.01); *H04W 36/06* (2013.01); *H04W 72/046* (2013.01)

(56) References Cited

U.S. PATENT DOCUMENTS

| | | | |
|---|---|---|---|
| 2014/0112254 A1 | 4/2014 | Lindoff et al. | |
| 2014/0301330 A1* | 10/2014 | Lee | H04W 74/0833 370/329 |
| 2015/0382205 A1 | 12/2015 | Lee | |
| 2016/0057783 A1 | 2/2016 | Rosa et al. | |
| 2016/0338109 A1* | 11/2016 | Rahman | H04W 56/005 |
| 2017/0251518 A1* | 8/2017 | Agiwal | H04W 24/08 |
| 2018/0115990 A1* | 4/2018 | Abedini | H04W 74/006 |
| 2018/0167979 A1* | 6/2018 | Guo | H04W 16/28 |
| 2018/0192347 A1* | 7/2018 | Shaheen | H04W 36/36 |
| 2018/0359653 A1* | 12/2018 | Svedman | H04W 24/10 |
| 2019/0373442 A1* | 12/2019 | Kim | H04W 24/10 |

FOREIGN PATENT DOCUMENTS

| | | |
|---|---|---|
| WO | 2014154246 A1 | 10/2014 |
| WO | 2017011802 A1 | 1/2017 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.0.0, Sep. 2016, 1-644.
Unknown, Author , "On separating mobility and data transmission", CMCC, 3GPP TSG RAN WG1 Meeting #86bis, R1-1612183, Reno, USA, Nov. 10-14, 2016, 1-6.
Unknown, Author , "RACH Procedures and Resource Configuration", Huawei, HiSilicon, 3GPPTSG RAN WG1 Meeting #88, R1-1701724, Athens, Greece, Feb. 13-17, 2017, 1-7.
Unknown, Author , "Views on mechanism to recover from beam failure", NTT Docomo, Inc., 3GPP TSG RAN WG1 Meeting #88, R1-1702799, Athens, Greece, Feb. 13-17, 2017, 1-4.
Unknown, Author , "WF on RACH association", ZTE et al., 3GPP TSG RAN WG1 Meeting #88, R1-1703630, Athens, Greece, Feb. 13-17, 2017, 1-7.
Unknown, Author, "Analysis and evaluation on RS configuration for RRM measurement of Connected and Idle UEs", 3GPP TSG RAN WG1 NR Ad Hoc Meeting, R1-1700403, Spokane, USA, Jan. 16-20, 2017, 1-7.
Unknown, Author, "DL Signals for Mobility Measurements in NR and Mobility schemes", 3GPP TSG-RAN WG1#88, R1-1703097, Athens, Greece, Feb. 13-17, 2017, 1-12.
Unknown, Author, "Further Consideration on Inter-cell HO Mechanism", 3GPP TSG-RAN WG2 Meeting #97, R2-1700985, Athens, Greece, Feb. 13-17, 2017, 1-3.
Unknown, Author, "Discussion on mobility procedure for NR", 3GPP TSG RAN WG1 NR Adhoc R1-1700615, Spokane, USA, Jan. 16-20, 2017, 1-9.
Unknown, Author, "Miscellaneous corrections to TS 36.331", 3GPP TSG-RAN WG2 Meeting #93bis R2-162447, Dubrovnik, Croatia, Apr. 11-15, 2016, 1-516.
"Introduction of option 3—Dual Connectivity with NR in E-UTRAN—RAN3 parts", 3GPP TSG-RAN WG3 Meeting #95bis, R3-17xxxx, Spokane, WA, USA, R3-171152, Apr. 3-7, 2017, pp. 1-47.

* cited by examiner

Parts of the *MobilityControlInfo* information element described in TS 36.331 with previously described parameters underlined

```
-- ASN1START

MobilityControlInfo ::=     SEQUENCE {
    targetPhysCellId            PhysCellId,
    carrierFreq                 CarrierFreqEUTRA            OPTIONAL,   -- Cond HO--
    toEUTRA2
    carrierBandwidth            CarrierBandwidthEUTRA       OPTIONAL,   -- Cond HO--
    toEUTRA
    additionalSpectrumEmission  AdditionalSpectrumEmission  OPTIONAL,   -- Cond HO--
    toEUTRA
    t304                        ENUMERATED {
                                    ms50, ms100, ms150, ms200, ms500, ms1000,
                                    ms2000, ms10000-v1310},
    newUE-Identity              C-RNTI,
    radioResourceConfigCommon   RadioResourceConfigCommon,
    rach-ConfigDedicated        RACH-ConfigDedicated        OPTIONAL,   --
    ...
}

-- ASN1STOP
```

Fig. 13

RACH-ConfigCommon IE containing generic RA parameters described in TS 36.331

```
-- ASN1START

RACH-ConfigCommon ::=      SEQUENCE {
    preambleInfo                    SEQUENCE {
        numberOfRA-Preambles            ENUMERATED {
                                        n4, n8, n12, n16, n20, n24, n28,
                                        n32, n36, n40, n44, n48, n52, n56,
                                        n60, n64},
        preamblesGroupAConfig           SEQUENCE {
            sizeOfRA-PreamblesGroupA        ENUMERATED {
                                            n4, n8, n12, n16, n20, n24, n28,
                                            n32, n36, n40, n44, n48, n52, n56,
                                            n60},
            messageSizeGroupA               ENUMERATED {b56, b144, b208, b256},
            messagePowerOffsetGroupB        ENUMERATED {
                                            minusinfinity, dB0, dB5, dB8, dB10,
dB12,
                                            dB15, dB18},
            ...
        }       OPTIONAL                                            -- Need OP
    },
    powerRampingParameters          PowerRampingParameters,
    ra-SupervisionInfo              SEQUENCE {
        preambleTransMax                PreambleTransMax,
        ra-ResponseWindowSize           ENUMERATED {
                                        sf2, sf3, sf4, sf5, sf6, sf7,
                                        sf8, sf10},
        mac-ContentionResolutionTimer   ENUMERATED {
                                        sf8, sf16, sf24, sf32, sf40, sf48,
                                        sf56, sf64}
    },
    maxHARQ-Msg3Tx                  INTEGER (1..8),
    ...,
    [[ preambleTransMax-CE-r13       PreambleTransMax                    OPTIONAL,
    -- Need OR
        rach-CE-LevelInfoList-r13    RACH-CE-LevelInfoList-r13           OPTIONAL --
Need OR
    ]]
}
```

Fig. 14A

```
RACH-ConfigCommon-v1250 ::=      SEQUENCE {
   txFailParams-r12              SEQUENCE {
      connEstFailCount-r12                ENUMERATED {n1, n2, n3, n4},
      connEstFailOffsetValidity-r12       ENUMERATED {s30, s60, s120, s240,
                                             s300, s420, s600, s900},
      connEstFailOffset-r12               INTEGER (0..15)   OPTIONAL  -- Need
OP
   }
}

RACH-ConfigCommonSCell-r11 ::=   SEQUENCE {
   powerRampingParameters-r11             PowerRampingParameters,
   ra-SupervisionInfo-r11                 SEQUENCE {
      preambleTransMax-r11                PreambleTransMax
   },
   ...
}

RACH-CE-LevelInfoList-r13 ::=   SEQUENCE (SIZE (1..maxCE-Level-r13)) OF RACH-
CE-LevelInfo-r13

RACH-CE-LevelInfo-r13 ::=    SEQUENCE {
   preambleMappingInfo-r13             SEQUENCE {
      firstPreamble-r13                INTEGER(0..63),
      lastPreamble-r13                 INTEGER(0..63)
   },
   ra-ResponseWindowSize-r13           ENUMERATED {sf20, sf50, sf80, sf120, sf180,
                                          sf240, sf320, sf400}, mac-ContentionResolutionTimer-r13   ENUMERATED {sf80, sf100, sf120,
                                          sf160, sf200, sf240, sf480, sf960},
   rar-HoppingConfig-r13               ENUMERATED {on,off},
   ...
}

PowerRampingParameters ::=       SEQUENCE {
   powerRampingStep              ENUMERATED {dB0, dB2,dB4, dB6},
   preambleInitialReceivedTargetPower ENUMERATED {
                                 dBm-120, dBm-118, dBm-116, dBm-114, dBm-
112,
                                 dBm-110, dBm-108, dBm-106, dBm-104, dBm-
102,
                                 dBm-100, dBm-98, dBm-96, dBm-94,
                                 dBm-92, dBm-90}
}

PreambleTransMax ::=             ENUMERATED {
                                 n3, n4, n5, n6, n7,n8, n10, n20, n50,
                                 n100, n200}

-- ASN1STOP
```

Fig. 14B

```
RACH-ConfigDedicated information element containing dedicated RA parameters described in TS 36.331
-- ASN1START RACH-ConfigDedicated ::=    SEQUENCE {
    ra-PreambleIndex        INTEGER (0..63),
    ra-PRACH-MaskIndex      INTEGER (0..15)
}

-- ASN1STOP
```

Fig. 15

RADIO NETWORK NODES, WIRELESS DEVICE AND METHODS PERFORMED THEREIN FOR HANDLING COMMUNICATION IN A WIRELESS COMMUNICATION NETWORK

TECHNICAL FIELD

Embodiments herein relate to radio network nodes, a wireless device and methods performed therein regarding wireless communication. Furthermore, a computer program and a computer-readable storage medium are also provided herein. In particular, embodiments herein relate to handling communication e.g. enabling handover or secondary cell establishment, of the wireless device in a wireless communication network.

BACKGROUND

In a typical wireless communication network, wireless devices, also known as wireless communication devices, mobile stations, stations (STA) and/or user equipments (UE), communicate via a Radio access Network (RAN) to one or more core networks (CN). The RAN covers a geographical area which is divided into service areas or cell areas, with each service area or cell area being served by radio network node such as an access node e.g. a Wi-Fi access point or a radio base station (RBS), which in some networks may also be called, for example, a "NodeB" or "eNodeB". The service area or cell area is a geographical area where radio coverage is provided by the access node. The access node operates on radio frequencies to communicate over an air interface with the wireless devices within range of the radio network node. The radio network node communicates over a downlink (DL) to the wireless device and the wireless device communicates over an uplink (UL) to the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipments. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3GPP and this work continues in the coming 3GPP releases, such as 4G and 5G networks such as New Radio (NR). The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies, the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Beamforming allows the signal to be stronger for an individual connection. On the transmit-side this may be achieved by a concentration of the transmitted power in the desired direction(s), and on the receive-side this may be achieved by an increased receiver sensitivity in the desired direction(s). This beamforming enhances throughput and coverage of the connection. It also allows reducing the interference from unwanted signals, thereby enabling several simultaneous transmissions over multiple individual connections using the same resources in the time-frequency grid, so-called multi-user Multiple Input Multiple Output (MIMO).

Scheduled reference signals, called channel-state information reference signals (CSI-RS), are transmitted when needed for a particular connection. CSI comprises Channel Quality Indicator (Cal), Precoding Matrix Indicator (PMI), and Rank Indicator (RI). The CQI is reported by wireless device to the radio network node. The wireless device indicates modulation scheme and coding scheme to the radio network node. To predict the downlink channel condition, CQI feedback by the wireless device may be used as an input. CQI reporting may be based on PMI and RI. PMI is indicated by the wireless device to the radio network node, which precoding matrix may be used for downlink transmission which is determined by RI. The wireless device further indicates the RI to the radio network node, i.e. the number of layers that should be used for downlink transmission to the wireless device. The decision when and how to transmit the CSI-RS is made by the radio network node and the decision is signalled to the involved wireless devices using a so-called measurement grant. When the wireless device receives a measurement grant it measures on a corresponding CSI-RS. The radio network node may choose to transmit CSI-RSs to a wireless device only using beam(s) that are known to be strong for that wireless device, to allow the wireless device to report more detailed information about those beams. Alternatively, the radio network node may choose to transmit CSI-RSs also using beam(s) that are not known to be strong for that wireless device, for instance to enable fast detection of new beam(s) in case the wireless device is moving.

The radio network nodes of a New Radio (NR) network transmit other reference signals as well. For instance, the radio network nodes may transmit so-called demodulation reference signals (DMRS) when transmitting control information or data to a wireless device. Such transmissions are typically made using beam(s) that are known to be strong for that wireless device.

In LTE, the main goal of CSI-RSs is to obtain channel state feedback for up to eight transmit antenna ports to assist the radio network node in its precoding operations. Release 10 supports transmission of CSI-RS for 1, 2, 4 and 8 transmit antenna ports. CSI-RSs also enable the wireless device to estimate the CSI for multiple cells rather than just its serving cell, to support future multi-cell cooperative transmission schemes. Notice that the purpose of CSI-RS measurements in LTE is not to support mobility across cells.

In LTE, an RRC_CONNECTED wireless device may perform a handover from a serving cell to a target cell by receiving from the serving cell a handover command, which is an RRCConnectionReconfiguration message. That contains all the necessary information for the wireless device to access the target cell, such as the target's physical cell identifier (PCI) and the Random Access Channel (RACH) configuration of the target cell.

In the Radio Resource Control (RRC) specification 3GPP TS 36.331 v.14.0.0, that information is encoded in the mobilityControlInfo information element (IE) present in the RRCConnectionReconfiguration message to indicate to the wireless device a handover. For the RACH information, there is a part that is common, part of the IE radioResourceConfigCommon and another optional part that is dedicated (e.g. a wireless device-specific preamble for a contention-free random access) encoded in rach-ConfigDedicated. Some of these IEs are underlined in FIG. 13, which shows parts of the MobilityControlInfo information element.

RACH configCommon IE containing generic RA parameters described in TS36.331 v.14.0.0 is shown in FIG. 14A and FIG. 14B.

RACH configDedicated IE containing dedicated RA parameters described in TS36.331 v.14.0.0 is shown in FIG. 15.

If the mobilityControlInfo contains the dedicated RACH information, the wireless device will use it for contention-free random access to the target cell, which should expect a given preamble, otherwise the wireless device should simply perform a contention-based random access per the configuration provided in the common RACH configuration, which is part of mobilityControlInfo.

New Radio (NR) may be designed as a system to support a wide range of frequencies, including bands where beamforming should be used to improve coverage and/or at least to boost the data channel signal to interference plus noise ratio (SINR) so that the wireless device transmits/receives with very high data rates.

Concerning mobility in RRC_CONNECTED state the following may be assumed:

1 Access information (e.g. RACH configuration) for the target cell is provided in a handover (HO) command to enable the wireless device to access the cell without reading system information. Access information may include beam specific information (if any).

Furthermore the following may also be assumed:

1 At least cell identity (ID) and all information required to access the target cell will be included in the HO command 2 For at least some cases information required for contention based and contention free access may be included in the HO command 3 To be studied what beam related information of the target cell may be required.

A wireless device would access the target cell in RRC_CONNECTED state in NR under current assumptions.

RAN1 terminology assumed that at least the combination of NR synchronization sequences (New Radio-Primary Synchronization Signal (NR-PSS) and/or New Radio-Secondary Synchronization Signal (NR-SSS)) and Physical Broadcast Channel (PBCH) constitutes a so called Synchronization Signal (SS) block. The SS block may also contain a Tertiary Synchronization signal (TSS) to indicate the Orthogonal Frequency Division Multiplexing (OFDM) symbol timing or equivalent information, but this is still for further study in RAN1. An RRC_CONNECTED wireless device trying to access a target cell should assume that the SS Block may be transmitted in the form of repetitive bursts of SS Block transmissions (denoted "SS Burst"), wherein such a SS burst consists of a number of SS Block transmissions following close after each other in time. Furthermore, a set of SS Bursts may be grouped together (denoted "SS Burst Set"), where the SS Bursts in the SS Burst Sets are assumed to have some relation to each other. Both SS Bursts and SS Burst Sets have their respective given periodicity. In the single beam scenarios, the network could configure time-repetition within one SS Burst in a wide beam. In multi-beam scenarios, at least some of these signals and physical channels (e.g. SS Block) would be transmitted in multiple beams, which could be done in different manners depending on network implementation.

The work on Rel-13 Full Dimension (FD)-MIMO specification in LTE primary includes the support for beamforming in LTE. An RRC_CONNECTED wireless device may be configured with a set of so-called Channel State Information Reference Signal (CSI-RS) processes that may be associated at the network side to different DL beams. These DL beams may be transmitted in different directions for the different subframes, see FIG. 1B. With beamformed CSI-RS, the wireless device may measure Channel State Information (CSI) on CSI-RS resources that are beamformed towards different directions. In other words, with beamformed CSI-RS the DL beam directions are actually mapped to the configured CSI-RS resources so reporting can be associated to DL beams at the network side.

FIG. 1A and FIG. 1B show that Rel-13 FD-MIMO specification in LTE supports an enhanced CSI-RS reporting called Class B for beamformed CSI-RS. Therein, an LTE RRC_CONNECTED wireless device may be configured with K beams (where 8>K>1) where it may be 1, 2, 4 or 8 port number for each beam. For feedback purposes such as PMI, RI and CQI there is a CSI-RS Resource Indicator (CRI) per CSI-RS. The wireless device reports CRI to indicate the preferred beam where the CRI is wideband, RI/CQI/PMI is based on legacy codebook (i.e. Rel-12) and CRI reporting period is an integer multiple of the RI. For Rel-14 enhancements in Full Dimension (eFD)-MIMO, the following is being considered as potential enhancements such as the extension of CSI-RS antenna port number up to 32 i.e. {20, 24, 28, 32} CSI-RS ports and the introduction of aperiodic CSI-RS.

CSI-RS may be the primary RS for beam management in NR. Compared to the beamformed CSI-RS in LTE, perhaps the main additional use case would be the analog beam sweep, possibly also used for fine time and frequency (T/F) tracking. Hence, more flexibility for the NR CSI-RS in NR is also envisioned such as:

Possibly transmitted within 1, 2 or 4 symbols;
Configurable bandwidth (i.e. not always full system as in LTE);
Orthogonal Frequency Division Multiplexing (OFDM) symbol may carry CSI-RS only;
Aperiodic, semi-persistent and periodic transmissions;

Most of the usage of CSI-RS in LTE is related to measurement to support beam management. In addition to that, CSI-RS may be used for Radio Resource Management (RRM) measurements to support inter-cell mobility, i.e. movement between cells, although details have not been defined.

Different beamforming implementations for the SS Block transmissions may be assumed in the case of handovers and the target cell may implement one of these different beamforming implementations.

In case a single beam transmits the SS Burst Set, the handover (HO) command may contain a single RACH configuration for the target cell. Once the wireless device receives the HO command the wireless device will access the target and a random access procedure will be triggered by the wireless device sending a random access preamble. That a device, node, radio base station or Transmission and Reception Point (TRP) supports directional reciprocity means that it can form a transmission beam based on a received transmission, such that the transmission will be focused in the opposite direction of the direction from which the received transmission was received (e.g. by selecting suitable precoding parameters and/or antenna weights). Unless directional reciprocity is assumed, the target cell will transmit the random access response (RAR) either by sweeping in all directions until the wireless device detects and transmits the handover complete message (or something equivalent to notify that the handover has been completed at the wireless device) or transmitting the RAR with time repetition and expect the HO complete message. In any of these cases, after the handover, depending on the data rates/service, the desired wireless device performance requires that the target cell triggers a beam management operation of beam refinement, enabling the wireless device to use in the target a narrow beam for PDCCH/PDSCH. That may require an additional RRC configuration, additional measurements and reporting mechanisms or additional delay to perform measurements in the target cell e.g. based on CSI-RS processes configured for beam management. In other words, after the handover, it may take some time until the wireless device again can access a narrow beam in the target cell, thus, it can take some time until the target cell can start to beamform PDSCH with high gain.

In case multiple narrow beams are used to transmit the SS Burst Set, the handover command may contain multiple RACH configurations for the target cell, associated with the SS Block beams or groups of SS Block beams from target cell. Once the wireless device receives the handover command it may select a SS Block beam in the target cell, check how it maps to the received RACH configuration per SS Block beam and initiate a random access procedure by sending a random access preamble associated with a target cell SS Block beam or a group of SS Block beams. A possible mapping is shown in the FIG. 1C.

Even without directional reciprocity, the implementation enables the target cell to transmit the RAR in the strongest DL beam (corresponding to the SS Block beam the UE received/selected) covering the wireless device thanks to the mapping between RACH configuration (including the preamble) and the target cell DL SS Block beam. That allows the wireless device to quickly access a narrow beam in the target right after handover execution.

Despite its benefit, such a solution has disadvantages in terms of rather high overhead and access latency, especially considering the following facts:

1) Most of the time that the sweeping of narrowSS Block beams of the SS Burst is being used, handovers are not even occurring; Hence, using the solution to enable a quick access to narrow beams in a target cell may be too costly without clear benefits in some cases.

2) In many cases, handovers would not really require an incoming wireless device to rely on a narrow high-gain beam in the target. In some cases, when the wireless device uses a low data rate service or is not even continuously transmitting data, a wide beam access in the target could be sufficient. Hence, the overhead would not be needed in some handovers.

An attempt to find a compromise between overhead and quick access to a beam is a case where beam sweeping is considered but wide beams are used to reduce the overhead. However, that solution does also not consider the previously described facts 1) and 2) since it is a static configuration. In other words, although the solution tries to enable the wireless device to access a DL beam at the target after handover execution, in some cases where the wireless device requires a refined DL beam, additional steps will anyway be needed in the target for beam refinement.

In summary, defining as narrow SS Block beams as possible in the SS Burst Set speeds up the wireless device access to a very narrow beam. On the other hand, the cost for that is the transmission of periodic beam sweepings of the SS Blocks in narrow beams, which may represent a significant overhead considering that it might mainly be useful these periods when the network, e.g. a neighboring gNB considers a handover into the cell for a wireless device. During initial access, one could claim that data connectivity has not yet started, hence, the wireless device may afford to start with a wide DL beam transmission until the network configures a set of CSI-RS processes for beam refinement/selection within the wide beam for higher data rates. However, in the case of handovers, a wireless device might already have a high data rate service in the serving cell so that a handover to a wide beam and then perform beam refinement, shown in FIG. 1D, may represent a non-seamless handover at least for some services. As shown in FIG. 1D, the source radio network node (cell-1) sends, before handover execution, a HO command with a single RACH configuration. The wireless device then, access to target after handover execution using random access (RA) preamble, RAR, and HO complete without (w/o) beam selection. The wireless device may perform beam refinement after the HO execution requiring RRC configuration, measurements and reporting. Beam refinement after HO execution may introduce additional signaling and delay to access a narrow beam. This may lead to a reduced or limited performance of the wireless communication network.

SUMMARY

An object of embodiments herein is to enable improved performance of a wireless communication network when using beamforming in the wireless communication network.

According to a first aspect, there is provided a method performed by a wireless device for handling communication of the wireless device in a wireless communication network. The wireless communication network comprises a first radio network node and a second radio network node, which first radio network node serves the wireless device. The wireless device receives an indication indicating a mapping between one or more channel state information reference signals (CSI-RSs) and one or more random access channel (RACH) configurations. The wireless device receives one or more CSI-RSs from the second radio network node, and selects a CSI-RS out of the one or more received CSI-RSs, e.g. highest measured signal quality. The wireless device further initiates a random access procedure towards the second radio network node using at least part of the RACH configuration mapped to the selected CSI-RS.

According to another aspect, there is provided a method performed by a second radio network node for handling communication of a wireless device in a wireless communication network. The wireless communication network comprises the second radio network node and a first radio network node. The first radio network node serves the wireless device. The second radio network node is configured with a mapping between one or more CSI-RSs and one or more RACH configurations. The second radio network node transmits one or more CSI-RSs associated to a respective beam, e.g. narrow beams, and detects an initiated random access procedure from the wireless device using at least part of a RACH configuration, which RACH configuration is mapped to a CSI-RS out of the one or more CSI-RSs transmitted. For example, the second radio network node receives a random access request from the wireless device using at least part of the random access channel configuration, e.g. a random access preamble, mapped to a certain CSI-RS and thus detects the certain CSI-RS selected at the wireless device. The second radio network node then uses the beam associated to the CSI-RS to perform data transmissions to or from the wireless device.

According to a further aspect, there is provided a method performed by a first radio network node for handling communication of a wireless device in a wireless communication network. The first radio network node serves the wireless device and the wireless communication network further comprises a second radio network node. The first radio network node transmits to the wireless device an indication indicating a mapping between one or more CSI-RSs and one or more RACH configurations of the second radio network node.

According to another aspect, there is provided a computer program comprising instructions, which, when executed on at least one processor, causes the at least one processor to carry out the methods herein, as performed by the wireless device, the first radio network node or the second radio network node. Furthermore, it is herein provided a computer-readable storage medium, having stored thereon a computer program comprising instructions which, when executed on at least one processor, cause the at least one processor to carry out the methods herein, as performed by the wireless device, the first radio network node or the second radio network node.

According to yet another aspect, there is provided a wireless device for handling communication of the wireless device in a wireless communication network comprising a first radio network node configured to serve the wireless device and a second radio network node. The wireless device is configured to receive an indication indicating a mapping between one or more CSI-RSs and one or more RACH configurations. The wireless device is configured to receive one or more CSI-RSs from the second radio network node, and to select a CSI-RS out of one or more received CSI-RSs. The wireless device is further configured to initiate a random access procedure towards the second radio network node by using at least part of the RACH configuration mapped to the selected CSI-RS.

According to still another aspect, there is provided a second radio network node for handling communication of a wireless device in a wireless communication network. The wireless communication network comprises the second radio network node and a first radio network node, wherein the first radio network node serves the wireless device and the second radio network node has a mapping between one or more CSI-RSs and one or more RACH configurations. The second radio network node is configured to transmit one or more CSI-RSs associated to a respective beam. The second radio network node is also configured to detect an initiated random access procedure from the wireless device using at least part of a RACH configuration, which RACH configuration is mapped to a CSI-RS out of the one or more CSI-RSs transmitted. The second radio network node is configured to use the beam associated to the CSI-RS to perform data transmissions to or from the wireless device.

According to yet still another aspect, there is provided a first radio network node for handling communication of a wireless device in a wireless communication network. The first radio network node is operative to serve the wireless device and the wireless communication network further comprises a second radio network node. The first radio network node is configured to transmit to the wireless device, an indication indicating a mapping between one or more CSI-RSs and one or more RACH configurations of the second radio network node.

Additionally, according to another aspect, there is provided a wireless device for handling communication of the wireless device in a wireless communication network comprising a first radio network node configured to serve the wireless device and a second radio network node. The wireless device comprises processing circuitry and a memory, said memory comprising instructions executable by said processing circuitry whereby said wireless device is operative to receive an indication indicating a mapping between one or more CSI-RSs and one or more RACH configurations. The wireless device is further operative to receive one or more CSI-RSs from the second radio network node, and to select a CSI-RS out of the one or more received CSI-RSs. The wireless device is also operative to initiate a random access procedure towards the second radio network node by using at least part of the RACH configuration mapped to the selected CSI-RS.

Furthermore, according to another aspect, there is provided a second radio network node for handling communication of a wireless device in a wireless communication network. The wireless communication network comprises the second radio network node and a first radio network node, wherein the first radio network node serves the wireless device and the second radio network node has a mapping between one or more CSI-RSs and one or more RACH configurations. The second radio network node comprises processing circuitry and a memory, said memory comprising instructions executable by said processing circuitry whereby said second radio network node is operative to transmit one or more CSI-RSs associated to a respective beam. The second radio network node is further operative to detect an initiated random access procedure from the wireless device using at least part of a RACH configuration, which RACH configuration is mapped to a CSI-RS out of the one or more CSI-RSs transmitted. The second radio network node is further operative to use the beam associated to the CSI-RS to perform data transmissions to or from the wireless device.

In addition according to another aspect, there is provided a first radio network node for handling communication of a wireless device in a wireless communication network. The first radio network node is operative to serve the wireless device and the wireless communication network further comprises a second radio network node. The first radio network node comprises processing circuitry and a memory, said memory comprising instructions executable by said processing circuitry whereby said first radio network node is operative to transmit to the wireless device, an indication indicating a mapping between one or more CSI-RSs and one or more RACH configurations of the second radio network node.

Embodiments herein allow the network to implement the transmission of e.g. SS Burst Sets in wide beams and, only when required, allow a wireless device e.g. performing a handover to quickly access a narrow beam associated with a CSI-RS at the second radio network node or a quick access to a narrow DL beam at the second radio network node for carrier aggregation and/or dual connectivity. This allows seamless mobility for high data rate services and, at the same time, does not enforce the network to implement a solution with high overhead, or even high latency, for a fixed overhead. In addition, this is achieved without the additional overhead of a beam refinement procedure to be performed after e.g. conclusion of the handover. By enabling the wireless device to use a RACH configuration mapped to a selected CSI-RS, resources are used in an efficient manner and selected target beam is quickly identified leading to an improved performance of the wireless communication network.

BRIEF DESCRIPTION OF THE DRAWINGS

Embodiments will now be described in more detail in relation to the enclosed drawings, in which:

FIG. 13 shows parts of the MobilityControlInfo information element;

FIG. 14A and FIG. 14B together illustrate the RACH configCommon IE; and

FIG. 15 shows the RACH configDedicated IE.

DETAILED DESCRIPTION

Figure 1A:
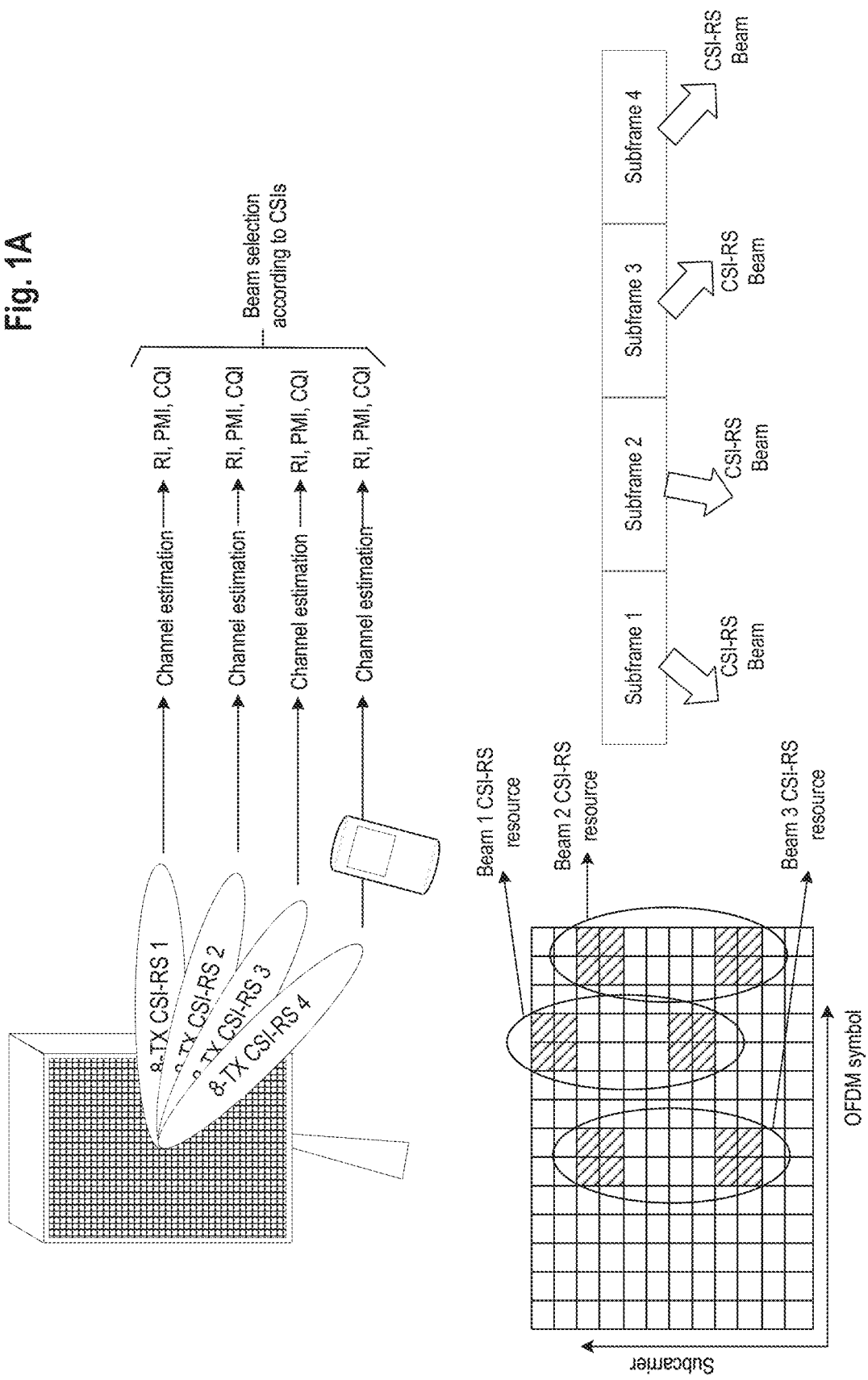
FIG. 1A shows beamformed CSI-RS in LTE.
Figure 1B:
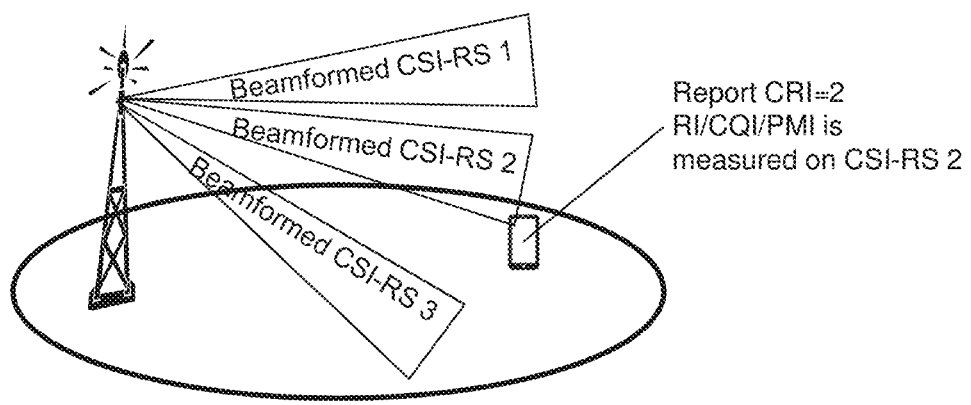
FIG. 1B shows beamformed CSI-RS in LTE.
Figure 1C:
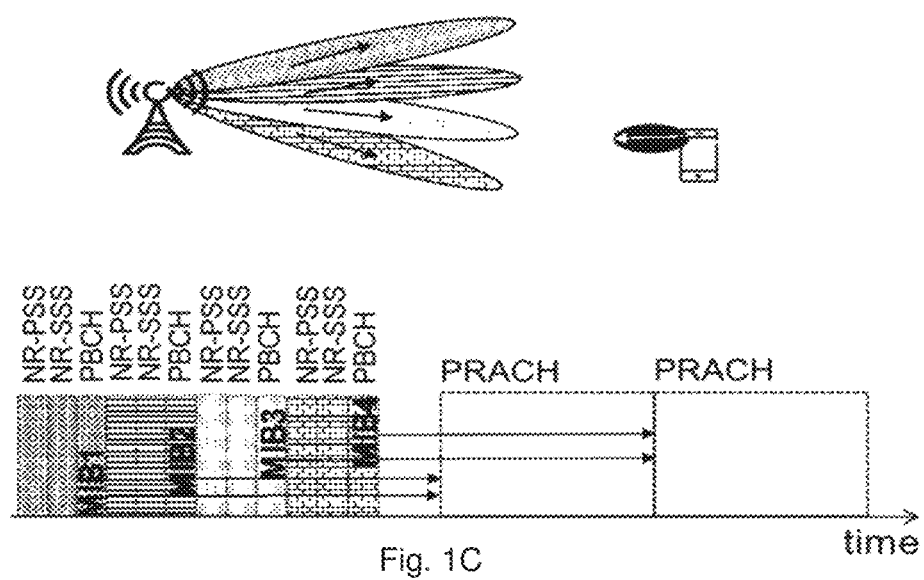
FIG. 1C shows wherein each SS Block contains a mapping between RACH configuration and the strongest DL beam transmitting the SS Block. In this example, each PRACH occasion/resource is associated with two SS Block beams.
Figure 1D:
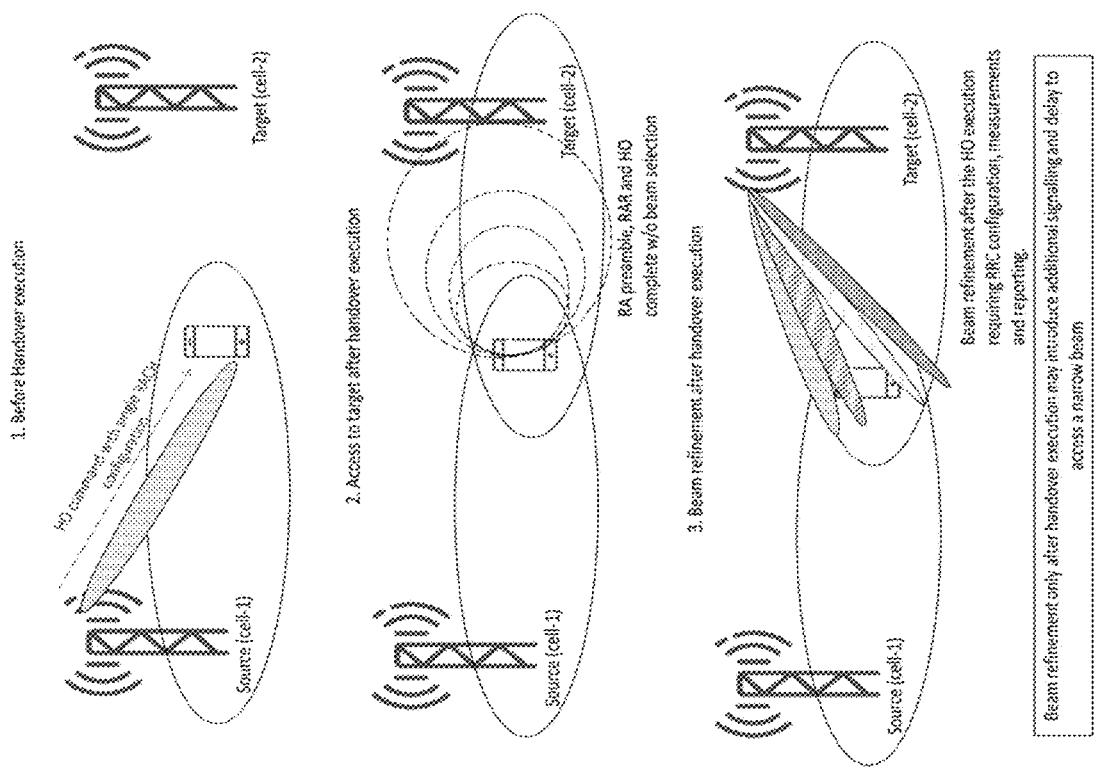
FIG. 1D shows an example showing a handover execution followed by beam refinement. That step may be necessary in the case of wide beam sweeping transmissions of the SS Burst.
Figure 2:
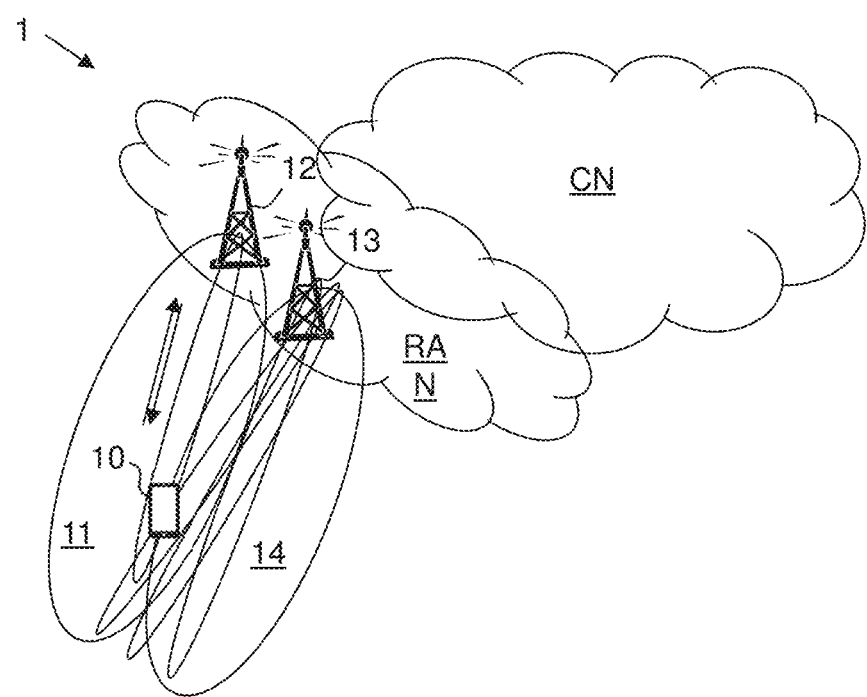
FIG. 2 shows a schematic overview depicting a wireless communication network according to embodiments herein.

Embodiments herein relate to wireless communication networks in general. FIG. 2 is a schematic overview depicting a wireless communication network 1. The wireless communication network 1 comprises one or more RANs and one or more CNs. The wireless communication network 1 may use one or a number of different technologies, such as New Radio (NR), Wi-Fi, LTE, LTE-Advanced, Fifth Generation (5G), Wideband Code-Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context such as NR. However, embodiments are also applicable in further development of the existing wireless communication systems such as e.g. WCDMA and LTE.

In the wireless communication network 1, wireless devices e.g. a wireless device 10 such as a mobile station, a non-access point (non-AP) STA, a STA, a user equipment and/or a wireless terminal, communicate via one or more Access Networks (AN), e.g. RAN, to one or more core networks (CN). It should be understood by the skilled in the art that "wireless device" is a non-limiting term which means any terminal, wireless communication terminal, user equipment, Machine-Type Communication (MTC) device, Device-to-Device (D2D) terminal, or node e.g. smart phone, laptop, mobile phone, sensor, relay, mobile tablets or even a small base station capable of communicating using radio communication with a network node within an area served by the network node.

The wireless communication network 1 comprises a first radio network node 12, also referred to as merely the radio network node, providing radio coverage over a geographical area, a first service area 11 or a first beam/beam group, of a first radio access technology (RAT), such as NR, LTE, Wi-Fi, WiMAX or similar. The first radio network node 12 may be a transmission and reception point e.g. a radio network node such as a Wireless Local-Area Network (WLAN) access point or an Access Point Station (AP STA), an access node, an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit or node capable of communicating with a wireless device within the service area served by the first radio network node 12 depending e.g. on the first radio access technology and terminology used. The first radio network node 12 may be referred to as a serving network node wherein the first service area may be referred to as a source beam, and the serving network node serves and communicates with the wireless device 10 in form of DL transmissions to the wireless device 10 and UL transmissions from the wireless device 10.

A second radio network node 13 may further provide radio coverage over a second service area 14 or a second beam/beam group of a second radio access technology (RAT), such as NR, LTE, Wi-Fi, WiMAX or similar. The first RAT and the second RAT may be the same or different RATs. The second radio network node 13 may be a transmission and reception point e.g. a radio network node such as a Wireless Local-Area Network (WLAN) access point or an Access Point Station (AP STA), an access node, an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit or node capable of communicating with a wireless device within the area served by the second radio network node 13 depending e.g. on the second radio access technology and terminology used. The second radio network node 13 may be referred to as a neighbor network node wherein the second service area 14 may be referred to as a neighbouring beam group with neighboring beams or target beams.

It should be noted that a service area may be denoted as a cell, a beam, a mobility measurement beam, a beam group or similar to define an area of radio coverage. The radio network nodes transmit additional RSs over respective service area. Hence, the first and second radio network nodes may transmit CSI-RSs or beam reference signals (BRS), repeatedly, in time, in a large number of different directions using as many Tx-beams as deemed necessary to cover an operational area of the respective radio network node. Hence the first radio network node 12 provides radio coverage over the first service area using a first reference signal, e.g. first CSI-RS, for the first service area 11 in the wireless communication network 1. The second radio network node 13 provides radio coverage over the second service area 14 using a second reference signal, e.g. second CSI-RS, for the second service area 14 in the wireless communication network. These reference signals, first and second CSI-RSs, may be initiated upon request from a radio network node, e.g. a neighboring radio network node, or configured to be sent continuously.

According to embodiments herein the wireless device use of one or more RSs also referred to as additional RSs, e.g. CSI-RS, from a target service area, such as the second service area 14, during a handover execution or secondary cell establishment to enable the target service area to immediately have beam refinement/selection of a narrow beam for high data rates transmission of e.g. PDSCH, without the need to increase the overhead by the transmission of a SS Burst in periodic sweepings of narrow beams.

It should be noted that in a general scenario the term "radio network node" can be substituted with "transmission and reception point". A distinction between the transmission reception points (TRPs) is made possible typically based on CSI-RSs or different synchronization signals and BRSs transmitted. Several TRPs may be logically connected to the same radio network node but if they are geographically separated, or are pointing in different propagation directions, the TRPs will be subject to the same issues as different radio network nodes. In subsequent sections, the terms "radio network node" and "TRP" can be thought of as interchangeable.

Figure 3:
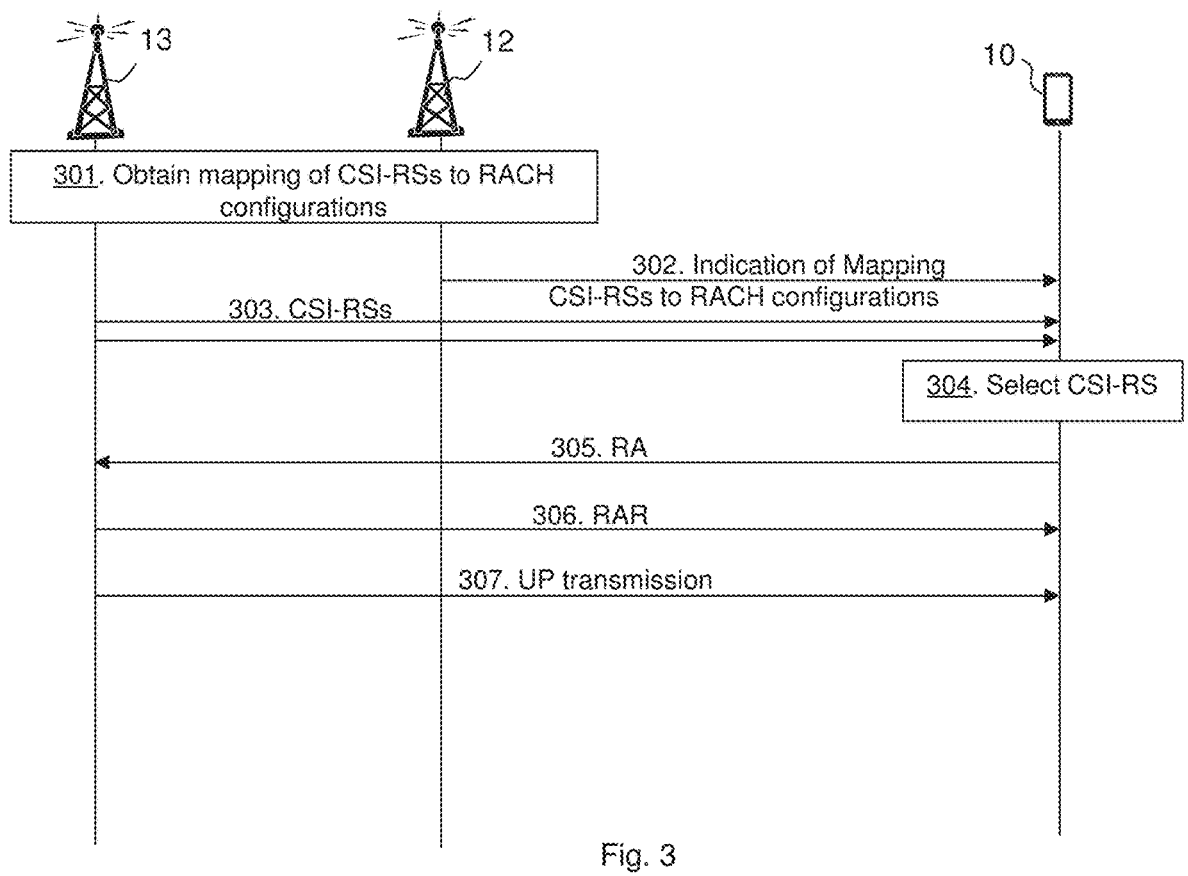
FIG. 3 is a schematic combined flowchart and signalling scheme according to embodiments herein.

FIG. 3 is a schematic combined flowchart and signalling scheme depicting some embodiments herein where it is defined what beam related information of the second radio network node 13 is informed to the wireless device 10 and how this may be used by the wireless device 10. Embodiments herein address the problem mentioned above by providing a method between the radio network nodes and the wireless device communicating over a radio interface.

Action 301. The first radio network node 12 may obtain e.g. be configured or may receive a mapping of one or more reference signals to one or more random access channel (RACH) configurations for a target service area e.g. of the second radio network node 13. The mapping may be between RACH configurations and target additional RSs such as BRSs or CSI-RSs. CSI-RS is used in the illustrated examples herein.

Action 302. The first radio network node 12 transmits the mapping, or an indication of the mapping, of the CSI-RSs to one or more RACH configurations. For example, the first radio network node 12 provides to an RRC_CONNECTED wireless device a mapping between RACH configurations and CSI-RSs that can be transmitted with high gain beamforming, which are different from static signals transmitted in wide beams. Static signals are the ones transmitted in the SS Block, such as NR-PSS/NR-SSS/TSS/DMRS for PBCH, while the additional RS is a CSI-RS. At the network side, the 'CSI-RS is associated with narrow beams while the SS Blocks are beamformed in wide beams, use cases for these different configurations will be described later.

The mapping may be provided to the wireless device 10 when the first radio network node 12 decides to handover the wireless device 10 from the first service area to the second service area and/or when the first radio network node 12 wants to establish dual connectivity, carrier aggregation or equivalent. That may be the case when the wireless device 10 is connected to LTE and the second service area is e.g. an NR cell candidate or a potential secondary cell for inter-RAT NR-LTE dual connectivity/tight interworking. Hence, the mapping or the indication of the mapping may be provided to the wireless device 10 in an RRC message such as RRCConnectionReconfiguration associated to a target (or candidate to be the SCell) in the same RAT or in a different RAT. The indication may be an index to a table, or values of the mapping as such, or similar.

The method may comprise the wireless device 10 receiving a command that triggers the wireless device 10 to access another cell, either as in a handover (as in the case of a handover) or in addition to a primary cell, as in the case of the establishment of a secondary cell (for dual connectivity and/or carrier aggregation). In the handover case, for example, that will be an RRCConnectionReconfiguration message with the mobilityControlInfo IE) containing a set of K candidate RACH configurations of the target cell where $1 \leq K \leq N$, where N is the number of DL narrow beams or CSI-RSs made available by the target cell/service area.

Each of these K RACH configurations is associated with one or a subset of the N CSI-RSs made available by the target cell/service area at least during the time the wireless device is trying to access the target/secondary cell/service area (i.e. handover execution or secondary cell establishment). There should be not more than one RACH configuration for a single CSI-RS. But multiple CSI-RSs may share the same RACH configuration.

The additional RS may be a CSI-RS used primarily for intra-cell beam management but also used for inter-cell mobility and/or secondary cell establishment and beam selection simultaneously. Hence, when CSI-RS is mentioned it should be understood as an embodiment, while it could be any other RS used for beam management that is not transmitted in a SS Block. In the particular case of the CSI-RS there may be parameters associated to beamformed CSI-RS such as: its bandwidth; the time domain resources they are being transmitted on such as subframes and Orthogoal Frequency-Division Multiplexing (OFDM) symbol within the subframes; time-domain sync reference to base the subframe offset on; frequency domain resources (since no full bandwidth CSI-RS); sequence and association to virtual cell ID or any other identifier that enables the wireless device 10 to derive the CSI-RS sequence, in the case blind detection is not expected.

RACH configuration in this context refers to information of e.g. the time-frequency-resources for the RACH preamble to be used during random access to the specified cell or a certain preamble or similar. Hence, there may be more common RACH parameters in addition to these ones used to perform narrow beam selection.

The RRC message that triggers the wireless device 10 to access the secondary/target cell/service area may contain configuration of N additional RSs (which can be CSI-RSs). In that context N can be larger or equal to one. Notice that these additional RSs are transmitted in or associated with different DL beams. That configuration about the target's/secondary cell's additional RS, may inform the wireless device 10 in which subframes the RSs are transmitted, for how long, which periodicity (in the case they are periodic), for how long they last (e.g. in terms of number of subframes), etc.

Alternatively, if only the RACH mapping and/or an indication flag is provided in the message the wireless device 10 may assume a previously received configuration for additional RS(s) associated to the target/secondary cell. It is also possible that the message contains a delta configuration that changes/update the RS configuration such as adding RSs (which would imply adding the transmission in additional DL beams), removing RS(s), etc.

The message such as the RRC message informing the wireless device 10 of the mapping may also contain an indication about the synchronization assumption of the target cell/secondary cell compared to the serving/primary cell. When receiving the mapping between RACH configurations and the additional RSs the wireless device 10 may then know that the detection prior to measurements may require additional synchronization or not. In the case it requires, the message may also contain the physical cell identifier (PCI) as an implicit way to inform the wireless device 10 that the detection of additional RS may require an additional synchronization step.

Action 303. The second radio network node 13 transmits reference signals of narrow beams, e.g. CSI-RSs or BRSs.

Action 304. The wireless device 10 selects a narrow beam i.e. a selected reference signal, e.g. based on measurements on received CSI-RSs. The wireless device 10 may thus perform a beam selection during handover execution or dual connectivity setup. For example, after receiving a RRC message from the serving cell that triggers the access to the target/secondary cell (e.g. RRCConnectionReconfiguration), the wireless device 10 searches for the CSI-RS associated to the target service area, performs measurements and selects the CSI-RS associated to the best quality or strength, for example, based on best Reference Signal Received Power (RSRP), Signal to Interference plus Noise Ratio (SINR), Signal to Noise Ratio (SNR) or some other measure of the signal strength or signal quality. In other words, the wireless device 10 may indirectly select the strongest DL narrow beam transmitting or being associated with the CSI-RS. Thus, the wireless device 10 receives and measures signal strength or quality (Q) of the CSI-RSs e.g. from both the first and the second radio network node. E.g. the wireless device 10 may determine which CSI-RS that has a highest Q out of the CSI-RSs.

Thus, upon receiving the RRC message to access a secondary and/or target cell or service area, the wireless device 10 may:

Sub-action 3.1) Search for the CSI-RS associated to the target cell;

Sub-action 3.2) Perform measurements based on the detected CSI-RS;

Sub-action 3.3) Select the CSI-RS associated to the best quality.

In sub-action 3.1), if the RRC message in action 302 contained an indication that the target cell or secondary cell is synchronized with the serving or primary cell, the wireless device 10 may use its primary cell synchronization source as reference (including its subframe timing) and search for a CSI-RS after receiving the RRC message (in the handover case that would be during the so-called synchronization phase). That search may be done based on the configuration of the CSI-RS i.e. in a specific subframe shift associated to the serving cell synchronization source used in connected mode. If the message did not contain that indication the wireless device 10 may use the target and/or secondary physical cell identifier to synchronize with the target and/or secondary cell prior to the detection of CSI-RSs or use a previously acquired synchronization with that same cell (in the case the time has not elapsed). As mentioned above, before actually detecting a CSI-RS in the target cell the wireless device 10 may have a rough synchronization with the DL transmissions of the target cell. Hence, the wireless device 10 first has to receive the synchronization signal of the target cell, i.e. the NR-PSS/NR-SSS, which is part of the SS Block (note that it may be enough for the wireless device 10 to receive the NR-PSS/NR-SSS, but may skip the reception of the remainder of the SS Block). The wireless device 10 may receive the NR-PSS/NR-SSS—and thus acquire DL synchronization in the target cell—and may detect the CSI-RS transmission(s) in one integrated procedure upon reception of the HO command in the serving cell. Alternatively, the wireless device 10 may previously have received the NR-PSS/NR-SSS of the target cell, e.g. for the purpose of neighbor cell measurements for potential handover considerations, and if not too long time has elapsed since the wireless device's latest reception of the NR-PSS/NR-SSS of the target cell (where the acceptable time may depend e.g. on the assumed or measured movements of the wireless device 10 and/or the assumed drift of the wireless device's internal clock in relation to the timing of the target cell), the wireless device 10 may consider its previously acquired DL synchronization with the target cell as still valid and may directly go for detection of the CSI-RS transmission(s) (without an additional reception of the NR-PSS NR-SSS) after receiving the HO command.

In sub-action 3.2), after discovering the CSI-RS resources, the wireless device 10 may perform measurements according to the previously obtained configuration or based on some pre-defined rule in the standard. These measurements may be so-called one-shot measurements in the time domain, as in the beam management procedures for CQI reporting, or it can be filtered measurements. The filtering may simply be a frequency domain filtering in the configured bandwidth for the CSI-RS, but it may also include time-domain parameters indicating that the wireless device 10 may measure at least a certain number of consecutive subframes before making a selection. Notice that this configuration may take into account the wireless device beamforming i.e. a certain number of repetition allowing the wireless device 10 to select its optimal beam.

In sub-action 3.3 the wireless device 10 may select the best CSI-RS, which is equivalent to the selection of the best DL narrow beam. That can be based on best RSRP, SINR, SNR, Channel State Information (CSI), or some other measure of the signal strength or signal quality.

Action 305. The wireless device 10 then performs a random access procedure or initiate a random access procedure using the RACH configuration mapped to the selected CSI-RS. Thus the wireless device 10 performs a Random access based on RACH-CSI-RS mapping. For example, after the selection of the strongest DL beam (based on measurements of the CSI-RS), the wireless device 10 may initiate a random access procedure associated to the configured RACH e.g. use a RACH preamble in a time-frequency resource, for the selected CSI-RS. Thus, the provided mapping should be used during the access of a target and/or secondary cell i.e. during a handover execution or the establishment/addition of a secondary cell. For example, after the CSI-RS selection, which is equivalent to a narrow DL beam selection, the wireless device 10 may look up the previously received (e.g. in the HO command) K candidate configurations for the target's RACH and select the RACH configuration associated with or mapped to the selected CSI-RS. After the look up the wireless device 10 may initiate a random access procedure with the target/secondary cell using the selected RACH configuration (i.e. the preamble and the time-frequency resources (and/or possibly code resource(s)) the preamble should be transmitted in), where the initiation of the access to the target cell consists of the wireless device 10 transmitting the configured random access preamble, which is an initial action of the random access procedure in the target cell.

Action 306. Upon the reception of the RACH preamble in the time-frequency resource that maps to a given DL beam, the second radio network node 13 detects what is the strongest DL narrow beam covering the wireless device 10. The second radio network node 13 may then respond to the wireless device 10 with a random access response (RAR). After sending the random access preamble associated with the selected CSI-RS, the wireless device 10 may expect to receive the RAR from the target cell within a time window, which can be considered as part of the RACH configuration indicated in the handover command or RCConnectionReconfiguration with a mobilityControlInfo IE. The time window for the RAR may also be standardized, either a single one for all cases or a time window that varies depending on conditions such as numerology used for the radio interface, carrier frequency, type of cell, other parts of the RACH configuration, etc. There may also be a standardized (single or variable) default configuration for the RAR time window, which may be overridden by a configuration included in the handover command. The configuration of the physical channel associated with the RAR may also be part of the RACH configuration per CSI-RS transmitted in the HO command, enabling a cell with multiple TRPs to transmit a RAR with a different configuration depending on which TRP of the target cell the wireless device 10 should connect to. The second radio network node 13 may transmit the RAR via the narrow beam and, even before setting up the beam management procedure, start using the selected DL beam with narrow gain beamforming for data transmission on PDSCH, immediately start after the handover complete message and/or the setup of the secondary cell. Another alternative is to use a wide beam to send the RAR and only use the knowledge of the narrow beam to initiate user plane (UP) data transmissions.

Action 307. The second radio network node 13 then performs user plane (UP) communication (DL or UL) with the wireless device 10 using the narrow beam associated with the RACH configuration of the random access procedure performed by the wireless device 10.

The second radio network node 13 may perform a DL beam selection for RAR and/or UP data. Upon the reception of the RACH preamble in the time/frequency resource that maps to a given DL beam, the second radio network node 13 detects what is the strongest DL narrow beam covering the wireless device 10.

It should be noted that the second radio network node 13 may transmit the RAR in action 306 via the narrow beam and, even before setting up the beam management procedure start using the select DL beam with narrow gain beamforming for data transmission on PDSCH, immediately start after the handover complete message and/or the setup of the secondary cell.

An advantage of embodiments herein is to enable the wireless device 10 to very quickly access a narrow (high gain) DL beam in a target cell and/or secondary cell for seamless mobility and effective carrier aggregation and/or dual connectivity.

Embodiments herein also allows for reduced overhead when transmitting narrow beams by not continuously transmitting CSI-RSs but instead only activating the CSI-RSs when they are needed such as at handover executions to support seamless mobility (including maintaining high data rate) when a wireless device is using a service in the serving cell requiring high data rates and hence the wireless device requires quick access to a narrow beam in the target cell.

Embodiments herein disclose usage of additional RSs, e.g. CSI-RSs, from a target service area during a handover execution or secondary cell establishment to enable the target service area to immediately have beam refinement/selection of a narrow beam for high data rates transmission of e.g. PDSCH, without the need to increase the overhead by the transmission of a SS Burst in periodic sweepings of narrow beams.

An additional aspect is that the wireless device 10 may acquire at least rough DL synchronization in the target cell from one signal of a certain type, while performing DL beam selection based on other signals of another type, wherein the two types of signals may have different configurations, e.g. in terms of different precoding parameters, e.g. different beamforming and beam gain.

Figure 4:
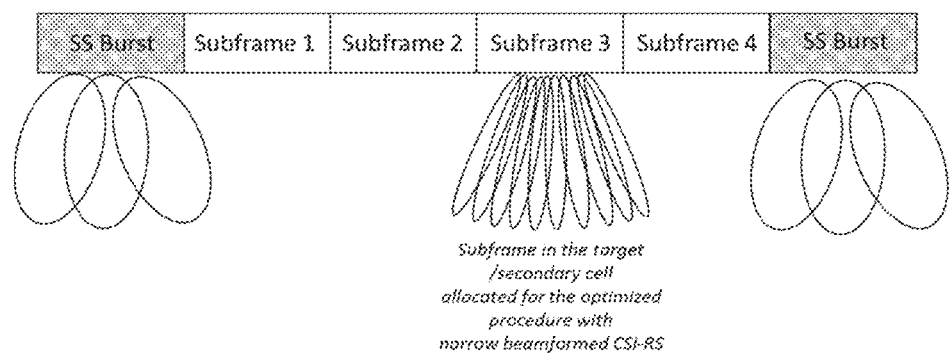
FIG. 4 shows subframes allocated to different signals such as SS bursts and reference signals for narrow beams.

Another aspect is that the wireless device 10 may perform the DL beam selection based on another type of signal than the wireless device 10 uses to acquire DL synchronization in the target/secondary cell as an integrated part of the handover/secondary cell addition procedure. This may be done integrated with the DL synchronization acquisition, as a single procedure, or, separated in a manner that the wireless device 10 acquires DL synchronization in the target cell as a preceding step, while performing only the beam selection step after receiving the handover command, i.e. as part of the actual handover execution. See FIG. 4.

Figure 5:
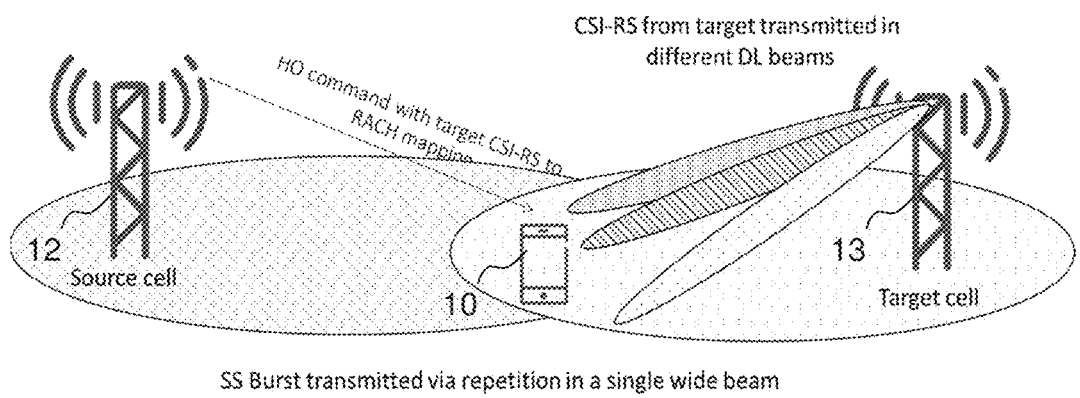
FIG. 5 shows where a target/secondary cell transmits the SS Burst in a single beam so the additional RS (such as CSI-RS) provide means to improve the RACH reception and/or enable the target cell to perform DL beam selection as part of the handover execution or the secondary cell establishment.

FIG. 5 illustrates the case where the (target) second radio network node 13 transmits the SS Burst in a single wide beam so the additional RSs, such as CSI-RSs, provide means to improve the RACH reception and/or enable the target cell to perform DL beam selection as part of the handover execution or the secondary cell establishment.

Figure 6:
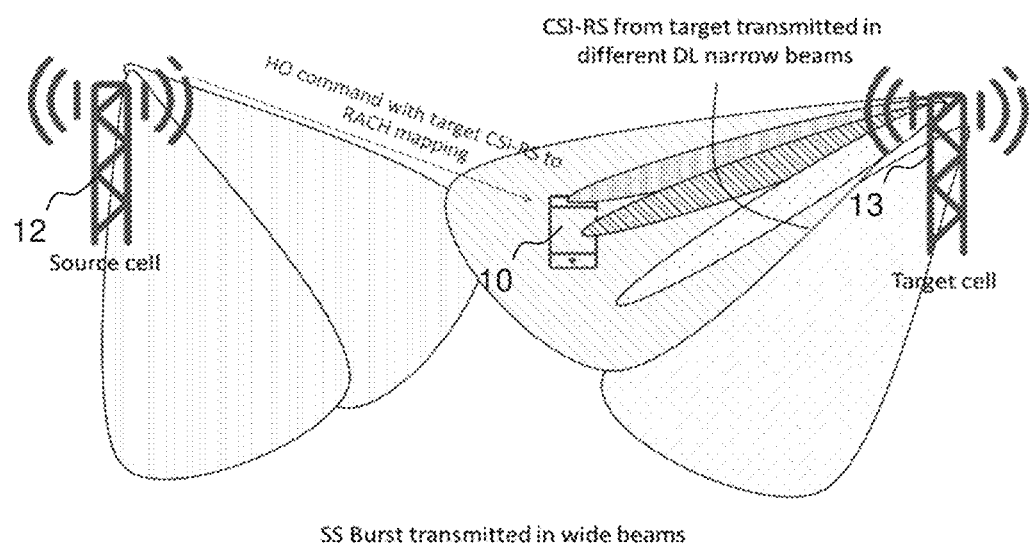
FIG. 6 shows where a target/secondary cell transmits the SS Burst in multiple wide beams so the additional RS (such as CSI-RS) provides means to improve even further the RACH reception and/or enable the target cell to perform DL beam selection as part of the handover execution or the secondary cell establishment.

FIG. 6 illustrates the case where the target/secondary cell, i.e. the second radio network node 13, transmits the SS Burst in multiple wide beams so the additional RSs (such as CSI-RSs from target transmitted in different DL narrow beams provide means to improve even further the RACH reception and/or enable the target cell to perform DL beam selection as part of the handover execution or the secondary cell establishment.

Figure 7:
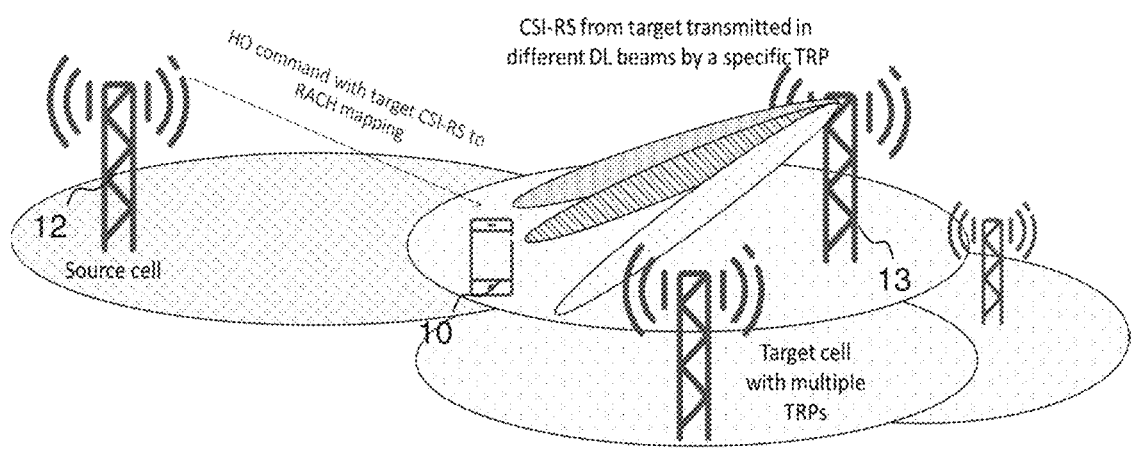
FIG. 7 shows where an additional RS is used in handover execution or secondary cell establishment/addition to indicate the exact TRP (radio network node) in a target cell/service area.

FIG. 7 illustrates the case where embodiments are applied to avoid ambiguities in the case of a target cell is defined by multiple TRPs transmitting SS Blocks multiplexed in the time domain. The additional RS is used in handover execution or secondary cell establishment/addition to indicate the exact TRP (radio network node) in a target cell/service area. CSI-RS from target transmitted in different DL beams by a specific TRP.

In some embodiments the information about the target's additional RS, which can be a CSI-RS and the RACH resource mapping after the CSI-RS selection may be encoded in a rach-ConfigDedicated IE which is part of the mobilityControlInfo IE, shown in FIG. 13.

The IE MobilityControlInfo information element (IE) may include parameters relevant for network controlled mobility.

The rach-ConfigDedicated information element, shown in FIG. 15, incudes the dedicated random access parameters.

Note that one could encode a list of RACH parameters where each value is associated to a previously configured CSI-RS that can be beamformed. Note that an ra-CsiRS-mapping parameter may be an index from 0 to N where the index associates to an acquired RACH configuration by the wireless device, either in the same RRC message or in a previously received message.

If absent the wireless device 10 applies contention based random access as specified. The RACH-ConfigDedicated IE is used to specify the dedicated random access parameters for a certain CSI-RS.

Figure 8A:
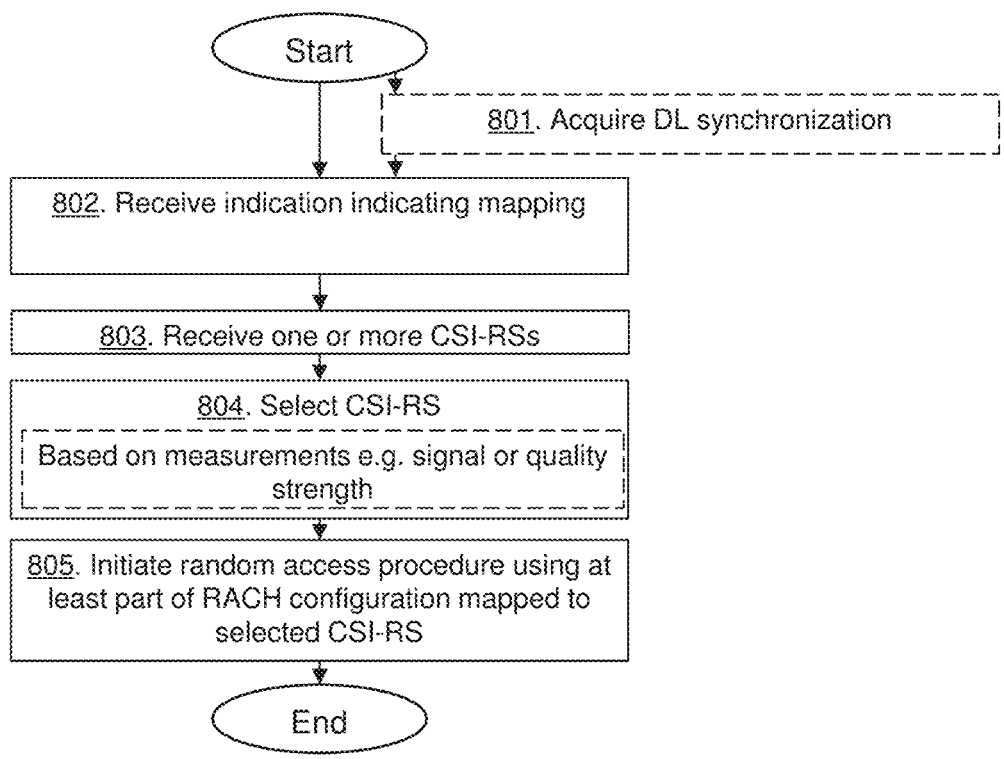
FIG. 8A shows a method performed by a wireless device according to embodiments herein.

Actions performed by the wireless device 10 handling communication of the wireless device in the wireless communication network according to some embodiments will now be described with reference to a flowchart depicted in FIG. 8A. The actions do not have to be taken in the order stated below, but may be taken in any suitable order. Additional optional actions performed in a subset of the embodiments are marked with dashed boxes. The wireless communication network 1 comprises the first radio network node 12 and the second radio network node 13, which first radio network node 12 serves the wireless device 10.

Action 801. The wireless device 10 may acquire downlink synchronization by receiving a Primary Synchronization Signal and a Secondary Synchronization Signal transmitted by the second radio network node 13 as part of a Synchronization Signal block.

Action 802. The wireless device 10 receives the indication indicating the mapping between one or more CSI-RSs and one or more RACH configurations. The mapping may be between a plurality of CSI-RSs and a plurality of RACH configurations. In some embodiments, not more than one RACH configuration may be mapped to a CSI-RS. The indication may be received in an RRC message. A RACH configuration may comprise time-frequency resources to be used for transmission of a RACH preamble and/or a specific preamble (or a set of random access preambles). The RACH configuration may also comprise a time window for receipt of a RAR and/or a configuration of a physical channel associated with the RAR.

Action 803. The wireless device 10 further receives one or more CSI-RSs from the second radio network node 13.

Action 804. The wireless device 10 selects a CSI-RS out of the one or more received CSI-RSs. The wireless device 10 may select the CSI-RS out of the one or more received CSI-RSs based on measurements on the received CSI-RSs, e.g. the CSI-RS associated to the best quality or strength may be selected.

Action 805. The wireless device 10 initiates the random access procedure towards the second radio network node 13 using at least part of the RACH configuration, such as a preamble, mapped to the selected CSI-RS.

Figure 8B:
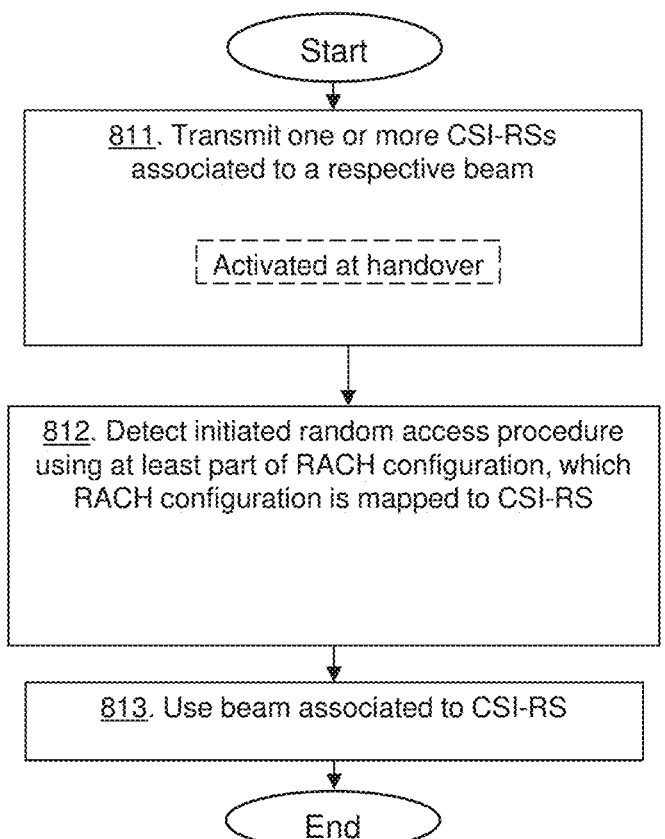
FIG. 8B shows a method performed by a second radio network node according to embodiments herein.

Actions performed by the second radio network node 13 for handling communication of the wireless device 10 in the wireless communication network 1 according to some embodiments will now be described with reference to a flowchart depicted in FIG. 8B. The actions do not have to be taken in the order stated below, but may be taken in any suitable order. Additional optional actions performed in a subset of the embodiments are marked with dashed boxes. The wireless communication network 1 comprises the second radio network node 13 and the first radio network node 12, wherein the first radio network node 12 serves the wireless device 10 and the second radio network node is configured with a mapping between one or more CSI-RSs and one or more RACH configurations. The mapping may be between a plurality of CSI-RSs and a plurality of RACH configurations. In some embodiments, not more than one RACH configuration may be mapped to a CSI-RS. The RACH configuration may comprise time-frequency resources to be used for transmission of a RACH preamble and/or a specific preamble. The RACH configuration may comprise the time window for receipt of the RAR and/or the configuration of the physical channel associated with the RAR.

Action 811. The second radio network node 13 transmits one or more CSI-RSs associated to a respective beam. In addition to the transmitted one or more CSI-RSs associated to a respective beam, the second radio network node 13 may further transmit a Primary Synchronization Signal and a Secondary Synchronization Signal as part of a Synchronization Signal block. The one or more CSI-RSs may be activated at handover.

Action 812. The second radio network node 13 detects an initiated random access procedure from the wireless device 10 using at least part of a RACH configuration, which RACH configuration is mapped to an CSI-RS out of the one or more CSI-RSs transmitted.

Action 813. The second radio network node 13 uses the beam associated to the CSI-RS to perform data transmissions to or from the wireless device. These transmissions may include e.g. a Random Access Response (RAR).

Figure 8C:
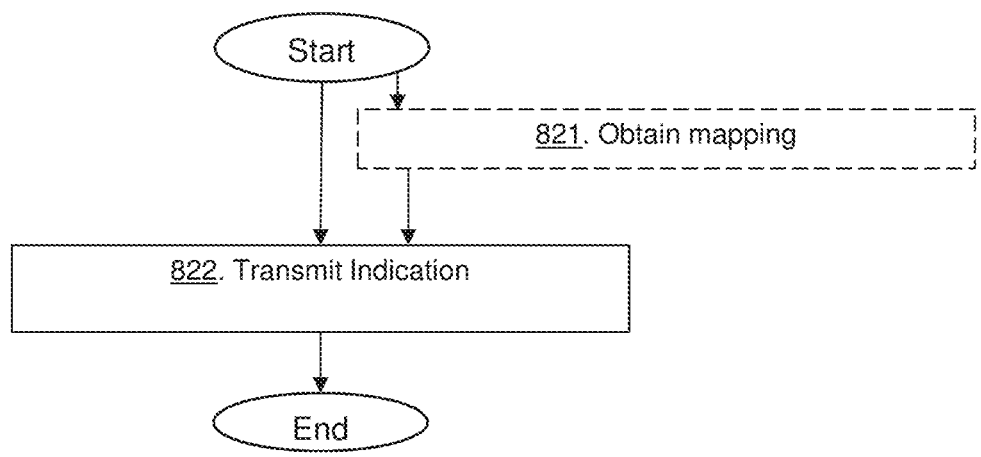
FIG. 8C shows a method performed by a first radio network node according to embodiments herein.

Actions performed by the first radio network node 12 for handling communication of the wireless device 10 in the wireless communication network 1 according to some embodiments will now be described with reference to a flowchart depicted in FIG. 8C. The actions do not have to be taken in the order stated below, but may be taken in any suitable order. Additional optional actions performed in a subset of the embodiments are marked with dashed boxes. The first radio network node 12 serves the wireless device 10 and the wireless communication network 1 further comprises the second radio network node 13.

Action 821. The first radio network node may obtain a mapping between one or more CSI-RSs and one or more RACH configurations.

Action 822. The first radio network node 12 transmits to the wireless device 10, the indication indicating the mapping between the one or more CSI-RSs and the one or more RACH configurations of the second radio network node 13. The mapping may be between a plurality of CSI-RSs and a plurality of RACH configurations. In some embodiments not more than one RACH configuration may be mapped to a CSI-RS.

The RACH configuration may comprise time-frequency resources to be used for transmission of a RACH preamble and/or a specific preamble. The RACH configuration may comprise the time window for receipt of the RAR, and/or the configuration of the physical channel associated with the RAR. The indication may be transmitted in an RRC message.

Figure 9:
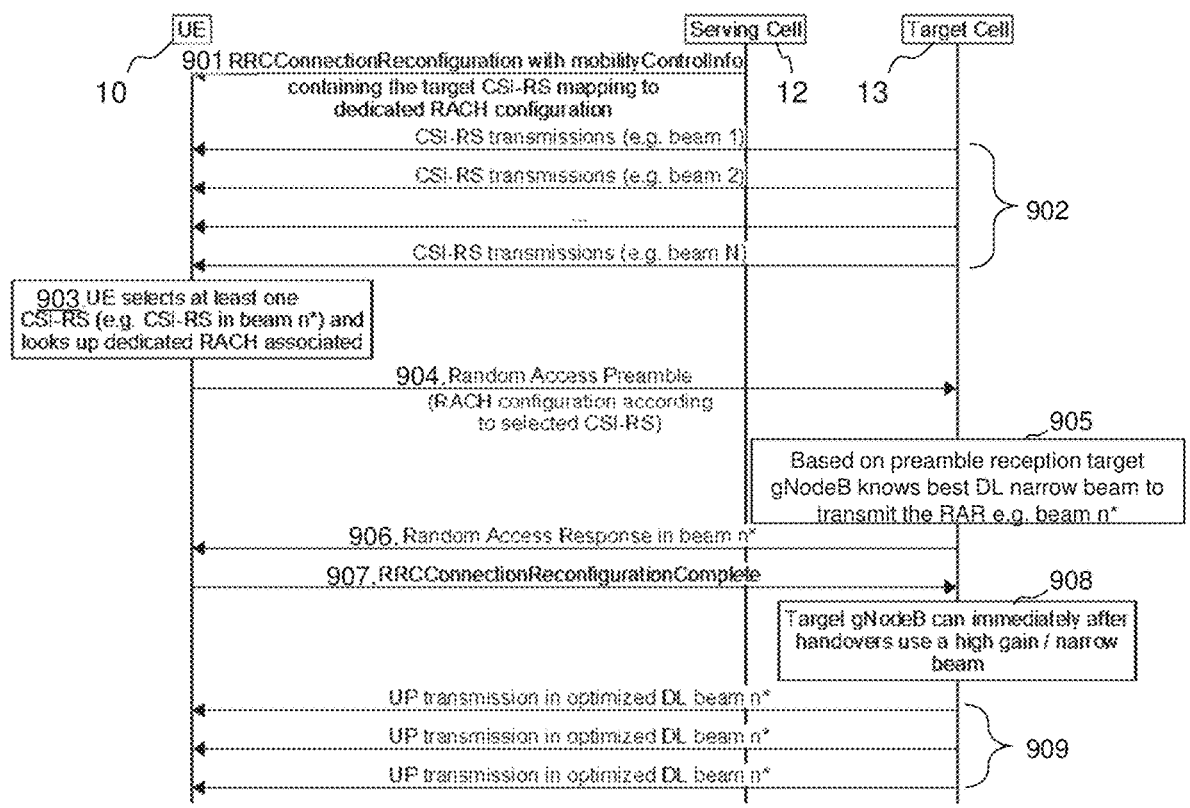
FIG. 9 is a combined flowchart and signalling scheme according to embodiments herein.

FIG. 9 is a schematic signalling scheme depicting some embodiments herein.

Action 901. The first radio network node 12 configures or transmits configuration parameters related to mapping of one or more reference signals (e.g. CSI-RSs) to RACH configurations, e.g. the first radio network node may transmit, to the wireless device 10, RRCConnectionReconfiguration with mobilityControlInfo containing the target CSI-RS mapping to dedicated RACH configuration.

Action 902. The second radio network node 13 may then transmit or perform a number (N) of transmissions of the narrow beams e.g. CSI-RS transmissions of different beams.

Action 903. The wireless device 10 may then select at least one CSI-RS (e.g. CSI-RS beam n*) and look up the dedicated RACH configuration according to the mapping.

Action 904. The wireless device 10 may transmit then transmit a Random Access preamble according to the RACH configuration of the selected CSI-RS.

Action 905. The second radio network node 13 may then initiate a beam transmission based on the received RA preamble. E.g. based on the preamble reception the second radio network node 13 knows the best DL narrow beam to transmit the RAR on, e.g. beam n*.

Action 906. The second radio network node 13 transmits the RAR in beam n* to the wireless device 10.

Action 907. The wireless device 10 may then transmit an RRCConnectionReconfiguration complete to the second radio network node 13.

Action 908. The target gNodeB (the second radio network node 13) may immediately after handover use a high gain/narrow beam.

Action 909. The second radio network node may thus perform UP transmissions in optimized DL beam n* to the wireless device 10.

Embodiments herein disclose the usage of additional RSs, e.g. CSI-RSs, from a target service area during e.g. a handover execution or secondary cell establishment to enable the second radio network node 13 to immediately have beam refinement/selection of a narrow beam for high data rates transmission of PDSCH, without the need to increase the overhead by the transmission of the SS Burst in periodic sweepings of narrow beams.

An additional aspect is that the wireless device 10 may acquire at least rough DL synchronization in the target cell from one signal of a certain type e.g. SS burst, while performing DL beam selection based on other signals of another type e.g. CSI-RSs, wherein the two types of signals may have different configurations, e.g. in terms of different precoding parameters, e.g. different beamforming and beam gain.

Another aspect is that the wireless device 10 may perform the DL beam selection based on another type of signal than the wireless device 10 uses to acquire DL synchronization in the target service area as an integrated part of the handover procedure, e.g. the handover execution and that this may be done integrated with the DL synchronization acquisition, as a single procedure, or, separated in a manner that the wireless device 10 acquires DL synchronization in the target cell as a preceding action, while performing only the beam selection action after receiving the handover command, i.e. as part of the actual handover execution.

Figure 10:
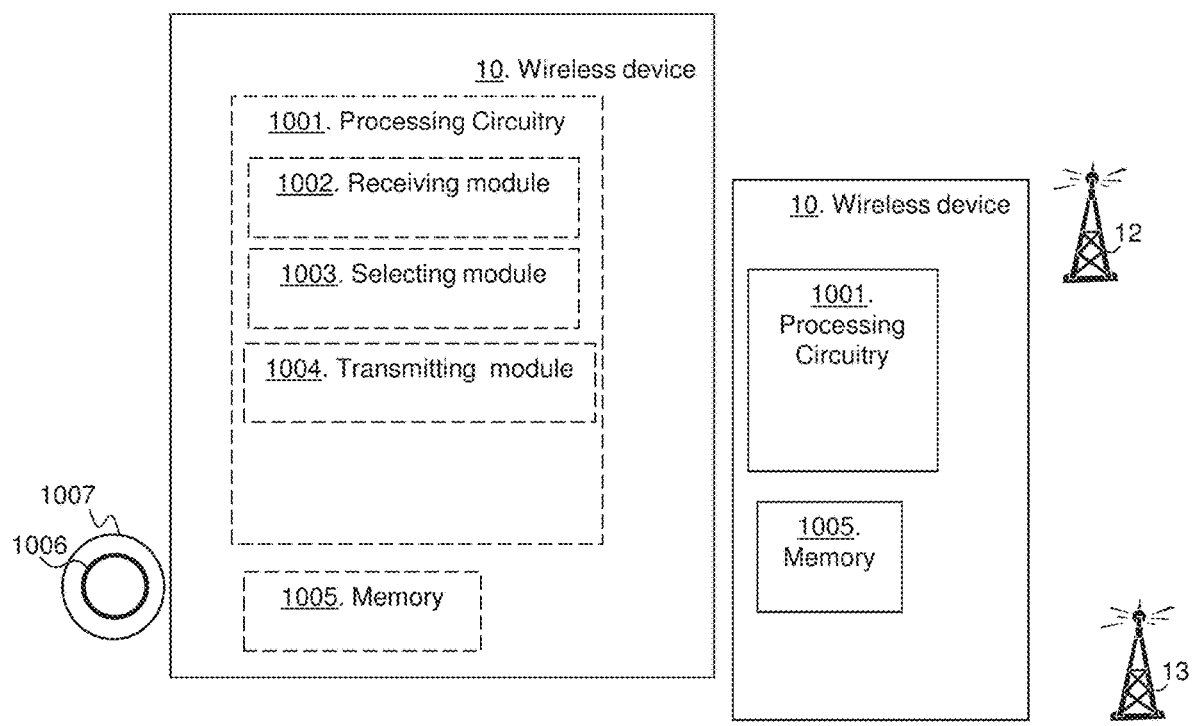
FIG. 10 is a block diagram depicting a wireless device according to embodiments herein.

FIG. 10 is a block diagram depicting, in two embodiments, the wireless device 10 according to embodiments herein for handling communication e.g. for selecting a radio network node or beam for communication, in the wireless communication network 1.

The wireless device 10 may be configured to be served by the first radio network node 12 providing radio coverage over the first service area 11, e.g. a narrow beam, using the first CSI-RS for the first service area 11 in the wireless communication network 1. The wireless communication network 1 further comprise the second radio network node 13 providing coverage with one or more narrow beams associated with additional RSs such as second CSI-RSs.

The wireless device 10 may comprise processing circuitry 1001, e.g. one or more processors, configured to perform the methods herein.

The wireless device 10 may comprise a receiving module 1002, e.g. a receiver or a transceiver. The wireless device 10, the processing circuitry 1001, and/or the receiving module 1002 is configured to receive, from the first radio network node 12, a mapping between one or more RSs and one or more RACH configurations. The wireless device 10, the processing circuitry 1001, and/or the receiving module 1002 is further configured to receive one or more CSI-RSs from the second radio network node 13.

The wireless device 10 may comprise a selecting module 1003. The wireless device 10, the processing circuitry 1001, and/or the selecting module 1003 is configured to select a CSI-RS, such as a second CSI-RS, out of the received RS based on signal strength or quality measured at the wireless device 10. Thus, selecting a beam associated with the reference signal.

The wireless device 10 may comprise a transmitting module 1004, e.g. a transmitter or a transceiver. The wireless device 10, the processing circuitry 1001, and/or the transmitting module 1004 is configured to initiate the random access process based on the selected CSI-RS, i.e. based on the RACH configuration mapped to the selected CSI-RS, e.g. to transmit a RA preamble associated to the selected CSI-RS.

The wireless device 10 further comprises a memory 1005. The memory comprises one or more units to be used to store data on, such as CSI-RSs, conditions, mappings, indices of CSI-RS and RACH configurations, strengths or qualities, applications to perform the methods disclosed herein when being executed, and similar.

The wireless device 10, the processing circuitry 1001, and/or the receiving module 1002 is configured to receive the indication indicating the mapping between the one or more CSI-RS and the one or more RACH configurations. The mapping may be between a plurality of CSI-RSs and a plurality of RACH configurations. According to some embodiments, not more than one RACH configuration may be mapped to a CSI-RS. The wireless device 10, the processing circuitry 1001, and/or the receiving module 1002 may be configured to receive the indication in an RRC message. The wireless device 10, the processing circuitry 1001, and/or the receiving module 1002 may further be configured to acquire downlink synchronization by receiving a Primary Synchronization Signal and a Secondary Synchronization Signal transmitted by the second radio network node as part of a Synchronization Signal block. A RACH configuration may comprise time-frequency resources to be used for transmission of a RACH preamble and/or a specific preamble, and/or the time window for receipt of the RAR and/or the configuration of the physical channel associated with the RAR.

The wireless device 10, the processing circuitry 1001, and/or the selecting module 1003 is configured to select a CSI-RS, such as a second CSI-RS, out of the one or more received CSI-RSs e.g. based on measurements on the received CSI-RSs. The wireless device 10, the processing circuitry 1001, and/or the selecting module 1003 may be configured to select the CSI-RS associated to the best quality or strength.

The wireless device 10, the processing circuitry 1001, and/or the transmitting module 1004 is configured to initiate the random access procedure towards the second radio network node 13 by using the at least part of the RACH configuration mapped to the selected CSI-RS.

The methods according to the embodiments described herein for the wireless device 10 may be implemented by means of e.g. a computer program 1006 or a computer program product, comprising instructions, i.e., software code portions, which, when executed on at least one processor, cause the at least one processor to carry out the actions described herein, as performed by the wireless device 10. The computer program 1006 may be stored on a computer-readable storage medium 1007, e.g. a disc, USB, memory or similar. The computer-readable storage medium 1007, having stored thereon the computer program, may comprise the instructions which, when executed on at least one processor, cause the at least one processor to carry out the actions described herein, as performed by the wireless device 10. In some embodiments, the computer-readable storage medium may be a non-transitory computer-readable storage medium. Thus, the wireless device 10 may comprise the processing circuitry and the memory, said memory comprising instructions executable by said processing circuitry whereby said wireless device is operative to perform the methods herein.

Figure 11:
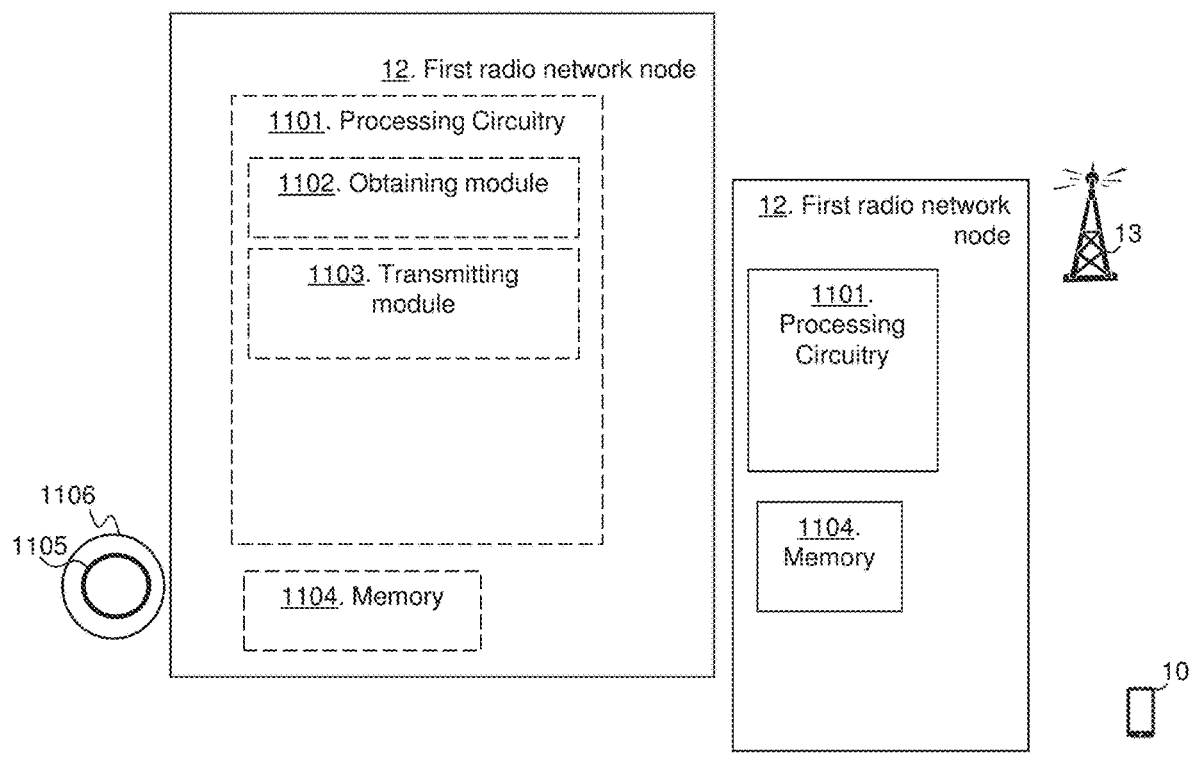
FIG. 11 is a block diagram depicting a first radio network node according to embodiments herein.

FIG. 11 is a block diagram depicting, in two embodiments, the first radio network node 12 according to embodiments herein for handling communication of the wireless device in the wireless communication network 1.

The first radio network node 12 may comprise processing circuitry 1101, e.g. one or more processors, configured to perform the methods herein.

The first radio network node 12 may comprise an obtaining module 1102, e.g. a receiver or a transceiver. The first radio network node 12, the processing circuitry 1101, and/or the obtaining module 1102 may be configured to obtain e.g. be configured or receive a mapping of one or more reference signals (e.g. CSI-RS) to one or more random access channel (RACH) configurations for the target service area e.g. of the second radio network node 13.

The first radio network node 12 may comprise a transmitting module 1103, e.g. a transmitter or transceiver. The first radio network node 12, the processing circuitry 1101, and/or the transmitting module 1103 is configured to transmit the indication indicating the mapping of reference signals to one or more RACH configurations. The indication may be one or more indices in a preconfigured table or be values of the CSI-RSs and the RACH configurations e.g. the mapping as such.

The first radio network node 12 further comprises a memory 1104. The memory comprises one or more units to be used to store data on, such as set of CSI-RSs, mappings, indices, parameters, applications to perform the methods disclosed herein when being executed, and similar.

The first radio network node 12, the processing circuitry 1101, and/or the obtaining module 1102 may be configured to obtain the mapping between the one or more CSI-RSs and the one or more RACH configurations. The mapping may be between a plurality of CSI-RSs and a plurality of RACH configurations. In some embodiments not more than one RACH configuration may be mapped to a CSI-RS. The RACH configuration may comprise time-frequency resources to be used for transmission of a RACH preamble and/or a specific preamble, and/or the time window for receipt of the RAR, and/or the configuration of the physical channel associated with the RAR.

The first radio network node 12, the processing circuitry 1101, and/or the transmitting module 1103 is configured to transmit to the wireless device 10, the indication indicating the mapping between the one or more CSI-RSs and the one or more RACH configurations of the second radio network node 13. The first radio network node 12, the processing circuitry 1101, and/or the transmitting module 1103 may be configured to transmit the indication in an RRC message.

The methods according to the embodiments described herein for the first radio network node 12 may be implemented by means of e.g. a computer program 1105 or a computer program product, comprising instructions, i.e., software code portions, which, when executed on at least one processor, cause the at least one processor to carry out the actions described herein, as performed by the first radio network node 12. The computer program 1105 may be stored on a computer-readable storage medium 1106, e.g. a disc, a USB, memory or similar. The computer-readable storage medium 1106, having stored thereon the computer program, may comprise the instructions which, when executed on at least one processor, cause the at least one processor to carry out the actions described herein, as performed by the first radio network node 12. In some embodiments, the computer-readable storage medium may be a non-transitory computer-readable storage medium. Thus, the first radio network node 12 may comprise the processing circuitry and the memory, said memory comprising instructions executable by said processing circuitry whereby said radio network node is operative to perform the methods herein.

Figure 12:
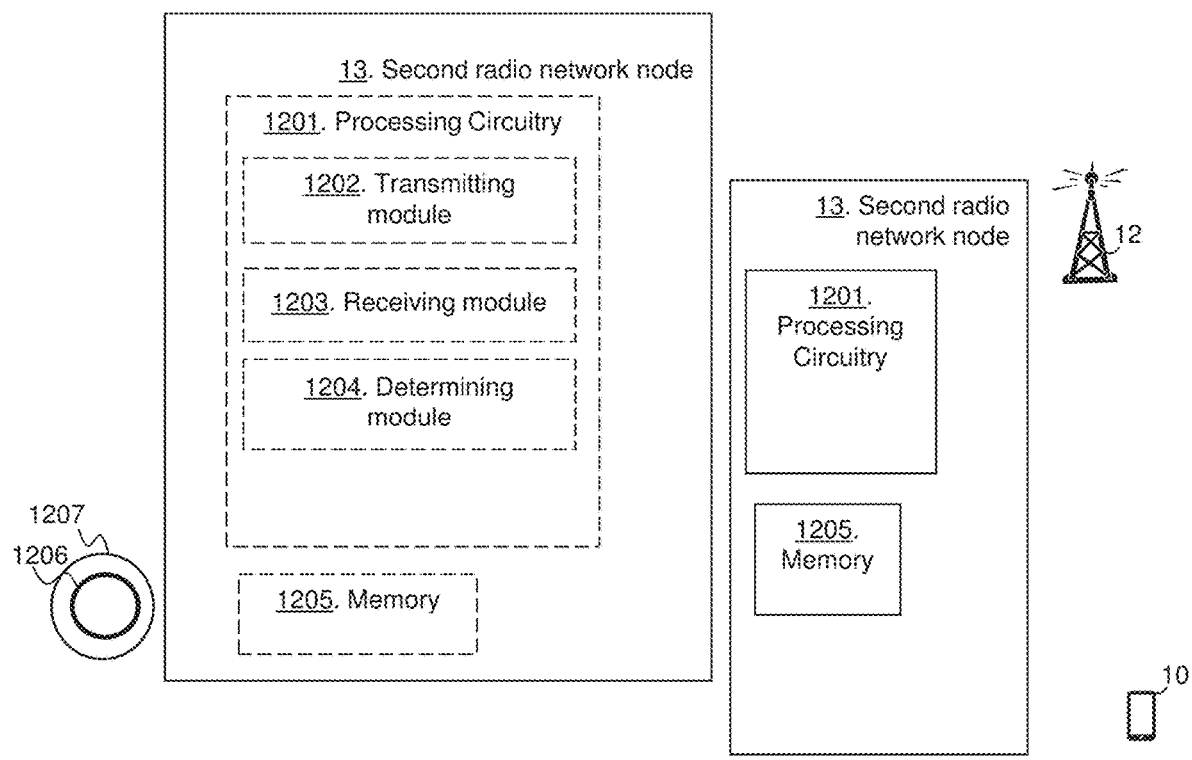
FIG. 12 is a block diagram depicting a second radio network node according to embodiments herein.

FIG. 12 is a block diagram depicting, in two embodiments, the second radio network node 13 according to embodiments herein for handling communication of the wireless device 10 in the wireless communication network 1. The second radio network node 13 may be configured for providing radio coverage over narrow beams using additional RSs (e.g. CSI-RSs), the second radio network node 13 may further be configured with the mapping between CSI-RSs and RACH configurations. The wireless communication network comprises the first radio network node 12 serving the wireless device 10.

The second radio network node 13 may comprise processing circuitry 1201, e.g. one or more processors, configured to perform the methods herein.

The second radio network node 13 may comprise a transmitting module 1202, e.g. a transmitter or a transceiver. The second radio network node 13, the processing circuitry 1201, and/or the transmitting module 1202 is configured to transmit one or more CSI-RSs providing radio coverage over one or more service areas. The second radio network node 13, the processing circuitry 1201, and/or the transmitting module 1202 may be configured to transmit the mapping between additional RSs (e.g. CSI-RSs) and RACH configurations.

The second radio network node 13 may comprise a receiving module 1203, e.g. a receiver or transceiver. The second radio network node 13, the processing circuitry 1201, and/or the receiving module 1203 is configured to receive a RACH transmission initiated by the wireless device 10. E.g. the second radio network node 13, the processing circuitry 1201, and/or the receiving module 1203 may be configured to receive a RACH preamble over a time and frequency from the wireless device 10.

The second radio network node 13 may comprise a determining module 1204. The second radio network node 13, the processing circuitry 1201, and/or the determining module 1204 is configured to determine CSI-RS based on the received RACH transmission from the wireless device 10. The second radio network node 13, the processing circuitry 1201, and/or the determining module 1204 may e.g. be configured to detect a CSI-RS, out of the one or more CSI-RSs transmitted, being selected by the wireless device in that the second radio network node detects the initiated random access procedure from the wireless device associated to one random access channel configurations being associated to the CSI-RS. The second radio network node 13, the processing circuitry 1201, and/or the transmitting module 1202 may then be configured to transmit data transmissions to the wireless device 10 using the beam associated with the determined RS.

The second radio network node 13 further comprises a memory 1205. The memory comprises one or more units to be used to store data on, such as CSI-RSs, mapping of CSI-RSs and RACH configurations, parameters, applications to perform the methods disclosed herein when being executed, and similar.

The wireless communication network 1 comprises the second radio network node 13 and the first radio network node 12, wherein the first radio network node 12 serves the wireless device 10 and the second radio network node has the mapping between the one or more CSI-RSs and the one or more RACH configurations.

The mapping may be between a plurality of CSI-RSs and a plurality of RACH configurations. In some embodiments, not more than one RACH configuration may be mapped to a CSI-RS. A RACH configuration may comprise time-frequency resources to be used for transmission of a RACH preamble and/or a specific preamble, and/or the time window for receipt of the RAR and/or the configuration of the physical channel associated with the RAR.

The second radio network node 13, the processing circuitry 1201, and/or the transmitting module 1202 is configured to transmit one or more CSI-RSs associated to a respective beam e.g. to transmit one or more CSI-RSs providing radio coverage over one or more service areas. The second radio network node 13, the processing circuitry 1201, and/or the transmitting module 1202 may further be configured to transmit, in addition to the transmitted one or more CSI-RSs associated to a respective beam, transmit a Primary Synchronization Signal and a Secondary Synchronization Signal as part of a Synchronization Signal block. The second radio network node may be configured to activate the one or more CSI-RSs at handover.

The second radio network node 13, the processing circuitry 1201, and/or the determining module 1204 is configured to detect the initiated random access procedure from the wireless device 10 using the at least part of the RACH configuration, which RACH configuration is mapped to the CSI-RS out of the one or more CSI-RSs transmitted.

The second radio network node 13, the processing circuitry 1201, and/or the transmitting module 1202 is configured to use the beam associated to the CSI-RS to perform data transmissions to or from the wireless device.

The methods according to the embodiments described herein for the second radio network node 13 may be implemented by means of e.g. a computer program 1206 or a computer program product, comprising instructions, i.e., software code portions, which, when executed on at least one processor, cause the at least one processor to carry out the actions described herein, as performed by the second radio network node 13. The computer program 1206 may be stored on a computer-readable storage medium 1207, e.g. a disc, a USB, memory or similar. The computer-readable storage medium 1207, having stored thereon the computer program, may comprise the instructions which, when executed on at least one processor, cause the at least one processor to carry out the actions described herein, as performed by the second radio network node 13. In some embodiments, the computer-readable storage medium may be a non-transitory computer-readable storage medium. Thus, the second radio network node 13 may comprise the processing circuitry and the memory, said memory comprising instructions executable by said processing circuitry whereby said radio network node is operative to perform the methods herein.

It should further be noted that a wireless communication network may be virtually network sliced into a number of Network/RAN slices, each Network/RAN slice supports one or more type of wireless devices and/or one or more type of services i.e. each network slice supports a different set of functionalities. Network slicing introduces the possibility that the network/RAN slices are used for different services and use cases and these services and use cases may introduce differences in the functionality supported in the different network slices. Each network/RAN slice may comprise one or more network nodes or elements of network nodes providing the services/functionalities for the respective network slice. Each network/RAN slice may comprise a network node such as a RAN node and/or a core network node.

The term "radio network node" can correspond to any type of radio network node or any network node, which communicates with a wireless device and/or with another network node. Examples of network nodes are NodeB, gNodeB, Master eNB, Secondary eNB, a network node belonging to Master cell group (MCG) or Secondary Cell Group (SCG), base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node e.g. Mobility Switching Centre (MSC), Mobile Management Entity (MME) etc.

In some embodiments the non-limiting term wireless device or user equipment (UE) is used and it refers to any type of wireless device communicating with a network node and/or with another wireless device in a cellular or mobile communication system. Examples of wireless devices are target device, device-to-device (D2D) UE, proximity capable wireless device (aka ProSe UE), machine type wireless device or wireless device capable of machine to machine (M2M) communication, PDA, PAD, Tablet, mobile terminals, smart phone, laptop embedded equipped (LEE), laptop mounted equipment (LME), USB dongles etc.

The embodiments are described for 5G, e.g. the "New Radio" (NR) 5G system being standardized by the $3^{rd}$ Generation Partnership Project (3GPP). However the embodiments are applicable to any RAT or multi-RAT systems, where the wireless device receives and/or transmit signals (e.g. data) e.g. LTE, LTE Frequency Duplex Division/Time Duplex Division (FDD/TDD), WCDMA/HSPA, GSM/GERAN, Wi Fi, WLAN, CDMA2000 etc.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a second radio network node for handling communication of a wireless device in a wireless communication network, wherein the wireless communication network comprises the second radio network node and a first radio network node, wherein the first radio network node serves the wireless device and the second radio network node is configured with a mapping between a plurality of channel state information reference signals, (CSI-RSs) and a plurality of random access channel (RACH) configurations, the method comprising:
   transmitting one or more CSI-RSs associated to a respective beam;
   detecting an initiated random access procedure from the wireless device using at least part of a RACH configuration;
   using the mapping to determine, based on the RACH configuration used for the initiated random access procedure, which CSI-RS out of the one or more CSI-RSs transmitted was selected by the wireless device; and
   using the beam associated to the CSI-RS to perform data transmissions to or from the wireless device.

2. The method of claim 1, wherein the mapping does not map more than one RACH configuration to any one of the plurality of CSI-RSs.

3. The method of claim 1, wherein in addition to the transmitted one or more CSI-RSs associated to a respective beam, the second radio network node further transmits a Primary Synchronization Signal and a Secondary Synchronization Signal as part of a Synchronization Signal block.

4. The method of claim 1, wherein a RACH configuration comprises time-frequency resources to be used for transmission of a RACH preamble or a specific preamble.

5. The method of claim 1, wherein the RACH configuration comprises a time window for receipt of a random access response (RAR) and/or a configuration of a physical channel associated with the RAR.

6. The method of claim 1, wherein the one or more CSI-RSs are activated at handover.

7. A second radio network node for handling communication of a wireless device in a wireless communication network, wherein the wireless communication network comprises the second radio network node and a first radio network node, wherein the first radio network node serves the wireless device and the second radio network node has a mapping between a plurality of channel state information reference signals (CSI-RSs) and a plurality of random access channel (RACH) configurations, and wherein the second radio network node comprises:
   processing circuitry; and
   a memory, said memory comprising instructions executable by said processing circuitry whereby said second radio network node is operative to:
     transmit one or more CSI-RSs associated to a respective beam;
     detect an initiated random access procedure from the wireless device using at least part of a RACH configuration;
     use the mapping to determine, based on the RACH configuration used for the initiated random access procedure, which CSI-RS out of the one or more CSI-RSs transmitted was selected by the wireless device; and
     use the beam associated to the CSI-RS to perform data transmissions to or from the wireless device.

8. The second radio network node of claim 7, wherein the mapping does not map more than one RACH configuration to any one of the plurality of CSI-RSs.

9. The second radio network node of claim 7, wherein in addition to the transmitted one or more CSI-RSs associated to a respective beam, the second radio network node is further operative to transmit a Primary Synchronization Signal and a Secondary Synchronization Signal as part of a Synchronization Signal block.

10. The second radio network node of claim 7, wherein a RACH configuration comprises time-frequency resources to be used for transmission of a RACH preamble or a specific preamble.

11. The second radio network node of claim 7, wherein the RACH configuration comprises a time window for receipt of a random access response (RAR) or a configuration of a physical channel associated with the RAR.

12. The second radio network node of claim 7, wherein the one or more CSI-RSs are activated at handover.

* * * * *